US012198848B2

(12) United States Patent
Arimitsu et al.

(10) Patent No.: US 12,198,848 B2
(45) Date of Patent: Jan. 14, 2025

(54) COIL DEVICE

(71) Applicant: TDK CORPORATION, Tokyo (JP)

(72) Inventors: Kazunori Arimitsu, Tokyo (JP); Nobuo Kitajima, Tokyo (JP)

(73) Assignee: TDK CORPORATION, Tokyo (JP)

( * ) Notice: Subject to any disclaimer, the term of this patent is extended or adjusted under 35 U.S.C. 154(b) by 788 days.

(21) Appl. No.: 17/375,353

(22) Filed: Jul. 14, 2021

(65) Prior Publication Data

US 2022/0399156 A1 Dec. 15, 2022

(30) Foreign Application Priority Data

Jun. 9, 2021 (JP) ................................ 2021-096873

(51) Int. Cl.
*H01F 27/29* (2006.01)
*H01F 27/28* (2006.01)
*H01F 27/30* (2006.01)

(52) U.S. Cl.
CPC ....... *H01F 27/292* (2013.01); *H01F 27/2828* (2013.01); *H01F 27/306* (2013.01)

(58) Field of Classification Search
CPC ... H01F 27/292; H01F 27/2828; H01F 27/306
See application file for complete search history.

(56) References Cited

U.S. PATENT DOCUMENTS 8,723,629 B1 * 5/2014 Liu ...................... H01F 27/022 336/212
10,319,514 B2 * 6/2019 Takagi ..................... H01F 3/10
11,424,070 B2 8/2022 Someya et al.
11,521,787 B2 12/2022 Someya et al.
2006/0290458 A1 * 12/2006 Sano ......................... H01F 3/12 336/212
2010/0253456 A1 * 10/2010 Yan ....................... H01F 27/306 336/83
2011/0005064 A1 * 1/2011 Klesyk ................ H01F 27/2823 29/605
2013/0154780 A1 * 6/2013 Yamada .................. H01F 27/29 336/175

(Continued)

FOREIGN PATENT DOCUMENTS

CN 1892932 A 1/2007
JP H02-118919 U 9/1990

(Continued)

OTHER PUBLICATIONS

May 9, 2024 U.S. Office Action issued in U.S. Appl. No. 17/375,740.

(Continued)

*Primary Examiner* — Malcolm Barnes
(74) *Attorney, Agent, or Firm* — Oliff PLC

(57) ABSTRACT

A highly reliable coil device is provided. An inductor 1 includes: a core 8; a coil 2 embedded inside the core 8; and terminals 4*a* and 4*b* provided with wire connecting portions 42*a* and 42*b*, to which lead-out portions 3*a* and 3*b* of the coil 2 are connected, the wire connecting portions 42*a* and 42*b* being disposed inside the core 8, in which the terminals 4*a* and 4*b* are disposed inside the core 8, and the terminals 4*a* and 4*b* include base portions 41*a* and 41*b* on which a second end portion 2*b* of the coil 2 in a winding axis direction is provided.

11 Claims, 15 Drawing Sheets

(56) References Cited

U.S. PATENT DOCUMENTS

| | | | | |
|---|---|---|---|---|
| 2014/0002227 | A1* | 1/2014 | Hsieh | H01F 5/003 336/200 |
| 2016/0247626 | A1* | 8/2016 | Kawarai | H01F 27/2823 |
| 2016/0351323 | A1 | 12/2016 | Wakamori et al. | |
| 2017/0221623 | A1 | 8/2017 | Kawarai et al. | |
| 2017/0229232 | A1* | 8/2017 | Takagi | H01F 27/306 |
| 2018/0174740 | A1* | 6/2018 | Muneuchi | H01F 27/2828 |
| 2019/0392977 | A1 | 12/2019 | Kawarai et al. | |
| 2020/0194161 | A1* | 6/2020 | Hu | H01F 17/04 |
| 2020/0303115 | A1* | 9/2020 | Satou | H01F 41/0206 |

FOREIGN PATENT DOCUMENTS

| | | | |
|---|---|---|---|
| JP | H03-051807 | U | 5/1991 |
| JP | H08-255717 | A | 10/1996 |
| JP | H10-022137 | A | 1/1998 |
| JP | 2001-155932 | A | 6/2001 |
| JP | 2002-313631 | A | 10/2002 |
| JP | 2006-128473 | A | 5/2006 |
| JP | 2007-165779 | A | 6/2007 |
| JP | 2008-041924 | A | 2/2008 |
| JP | 2011-243703 | A | 12/2011 |
| JP | 2013-125896 | A | 6/2013 |
| JP | 2016-157751 | A | 9/2016 |
| JP | 2018-133402 | A | 8/2018 |
| JP | 2019-057722 | A | 4/2019 |
| JP | 2020-013856 | A | 1/2020 |

OTHER PUBLICATIONS

U.S. Appl. No. 17/375,370, filed Jul. 14, 2021 in the name of Kazunori Arimitsu et al.

U.S. Appl. No. 17/375,740, filed Jul. 14, 2021 in the name of Kazunori Arimitsu et al.

U.S. Appl. No. 17/375,760, filed Jul. 14, 2021 in the name of Kazunori Arimitsu et al.

Apr. 10, 2024 Office Action issued in U.S. Appl. No. 17/375,760.

Aug. 21, 2024 Notice of Allowance issued in U.S. Appl. No. 17/375,760.

Sep. 16, 2024 Non-Final Rejection received in U.S. Appl. No. 17/375,370.

Sep. 30, 2024 Notice of Allowance received in U.S. Appl. No. 17/375,740.

* cited by examiner

COIL DEVICE

BACKGROUND OF THE INVENTION

Field of the Invention

The present invention relates to a coil device used as, for example, an inductor.

Description of the Related Art

As a coil device used as an inductor or the like, there is known a coil device including an element body, a coil embedded inside the element body, and a terminal whose wire connecting portion, connected to a lead-out portion of the coil, is disposed inside the element body (Japanese Patent Laid-Open No. 2011-243703). The coil device described in Japanese Patent Laid-Open No. 2011-243703 is manufactured by providing, inside a mold, the coil in a state where the terminal (wire connecting portion) is connected to the lead-out portion, filling the mold with magnetic powder constituting the element body to cover the coil, and compressing the magnetic powder by using a jig (upper and lower punches or the like) of the mold.

In this way, in the step of compressing the magnetic powder, a pressing force generated during compression molding acts on the coil, and accordingly, there is a concern that a problem such as a displacement of the coil from a predetermined position in a winding axis direction is generated inside the magnetic powder. In this case, the position of the coil inside the element body is not determined, and there is a concern that deviations occur in inductance characteristics and the like in products, and reliability of the products is reduced.

SUMMARY OF THE INVENTION

The present invention has been made in view of such circumstances, and an object of the present invention is to provide a highly reliable coil device.

In order to achieve the object, a coil device according to the present invention includes:

an element body;

a coil embedded in the element body; and a terminal including a wire connecting portion connected to a lead-out portion of the coil and disposed inside the element body, in which the terminal includes a base portion disposed inside the element body and an end portion of the coil in a winding axis direction is placed on the base portion.

In the coil device according to the present invention, the terminal includes the base portion disposed inside the element body and the end portion of the coil in the winding axis direction is placed on the base portion. Therefore, at the time of manufacturing the coil device, it is possible to provide the coil together with the terminal inside the mold in a state where the end portion of the coil in the winding axis direction is placed on the base portion. Accordingly, since the end portion of the coil in the winding axis direction is supported by the base portion by placing the end portion of the coil in the winding axis direction on the base portion, even a pressing force acts on the coil during the compression molding, the coil is less likely to be displaced in the winding axis direction, and the position of the end portion of the coil in the winding axis direction is fixed to the position of the base portion. Therefore, it is possible to determine the position of the coil inside the element body at a predetermined position, and it is possible to prevent generation of deviations in the inductance characteristics and the like in products due to deviations in the position of the coil and to realize a highly reliable coil device.

Preferably, a part of the lead-out portion of the coil is placed on the base portion together with the end portion of the coil in the winding axis direction. With such a configuration, since a part of the lead-out portion of the coil is supported by the base portion, even a pressing force acts on the lead-out portion of the coil during the compression molding, the lead-out portion of the coil is less likely to be displaced in the winding axis direction. Therefore, it is possible to determine the position of the lead-out portion of the coil inside the element body at a predetermined position, and it is possible to effectively prevent generation of deviations in the inductance characteristics and the like in products due to deviations in the position of the lead-out portion.

Preferably, the base portion has a flat plate shape extending in a direction substantially orthogonal to the winding axis direction, and the wire connecting portion is raised from the base portion along the winding axis direction. By forming the base portion into the flat plate shape as described above, it is possible to place the coil on the base portion in a stable state without tilting the end portion of the coil in the winding axis direction. Further, by raising the wire connecting portion from the base portion along the winding axis direction, the wire connecting portion can be disposed near a lead-out position of the lead-out portion of the coil placed on the base portion, and the lead-out portion can be easily connected to the wire connecting portion. In addition, a height position of the lead-out portion of the coil and a height position of the wire connecting portion are easily aligned with each other, and in this respect, the lead-out portion can also be easily connected to the wire connecting portion.

Preferably, the base portion has a flat plate shape extending in a direction substantially orthogonal to the winding axis direction, and a connecting portion raised along the winding axis direction at a position different from that of the wire connecting portion and the connecting portion extends to be exposed to the outside along a side surface of the element body is formed on the base portion. Accordingly, by forming the connecting portion to be raised from the base portion and to be exposed to the outside along the side surface of the element body, it is possible to form a solder fillet on the connecting portion when mounting the coil device, and it is possible to increase mounting strength of the coil device.

Preferably, the connecting portion includes a side lead-out portion connected to the base portion and extending toward the side surface of the element body, and a mounting auxiliary portion connected to the side lead-out portion and extending along the side surface of the element body, and a mounting portion formed on a mounting surface of the element body to extend toward the center of the element body is connected to the mounting auxiliary portion. By leading out the connecting portion to the side surface of the element body via the side lead-out portion and further bending the connecting portion a plurality of times to form the mounting auxiliary portion and the mounting portion, it is possible to sufficiently ensure lengths of the mounting auxiliary portion and the mounting portion, and it is possible to increase the mounting strength of the coil device.

Preferably, the end portion of the coil in the winding axis direction is placed on the base portion such that a part of an inner edge portion of the base portion is located between an outer peripheral surface and an inner peripheral surface of the coil. With such a configuration, it is possible to dispose the end portion of the coil in the winding axis direction on the base portion in a stable state. In addition, since the inner edge portion of the base portion is not disposed in a passage of the magnetic flux passing through the inner peripheral side of the coil, it is possible to favorably ensure the passage of the magnetic flux to realize the coil device having favorable inductance characteristics.

Preferably, a center of the coil is displaced with respect to a center of the element body. With such a configuration, it is possible to ensure, around the coil, a space having an area corresponding to a displacement width of the center of the coil, and to dispose a part of the terminal (wire connecting portion or the like) in this space. Therefore, it is not necessary to expand a part of the element body to the outer side in order to ensure a space for disposing a part of the terminal, and it is possible to reduce the size of the coil device.

Preferably, the terminal comprises a pair of terminals including a first terminal and a second terminal, and the coil is placed on the base portion such that an outer peripheral surface of the coil does not exceed a virtual line defined to connect a first wire connecting portion of the first terminal and a second wire connecting portion of the second terminal. With such a configuration, it is possible to dispose the outer peripheral surface of the coil at a position sufficiently separated from the side surface of the element body, it is possible to sufficiently ensure a thickness of the element body, and it is possible to prevent occurrence of cracks in the side surface of the element body.

DETAILED DESCRIPTION OF THE PREFERRED EMBODIMENTS

Figure 1:
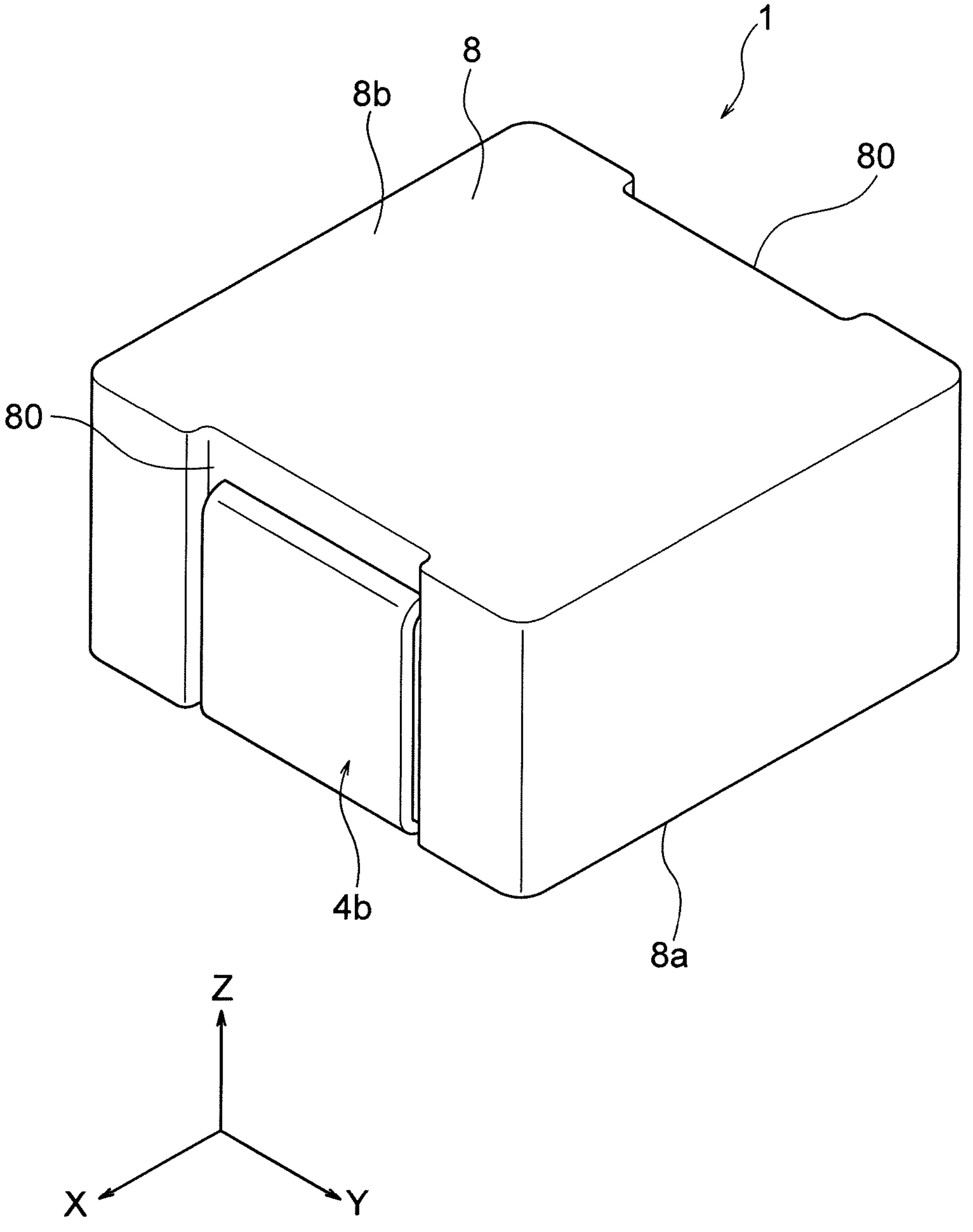
FIG. 1 is a perspective view of a coil device according to an embodiment of the present invention.

Hereinafter, the present invention will be described based on embodiments shown in the drawings.

As shown in FIG. 1, an inductor 1 according to an embodiment of the present invention is a surface mounting type inductor and has a substantially rectangular parallelepiped shape. In FIG. 1, a surface of the inductor 1 on a Z-axis negative direction side is a mounting surface 8*a*, and the surface is disposed to face a circuit board or the like. Hereinafter, in the inductor 1, a surface opposite to the mounting surface is referred to as an opposite mounting surface 8*b*.

Figure 2:
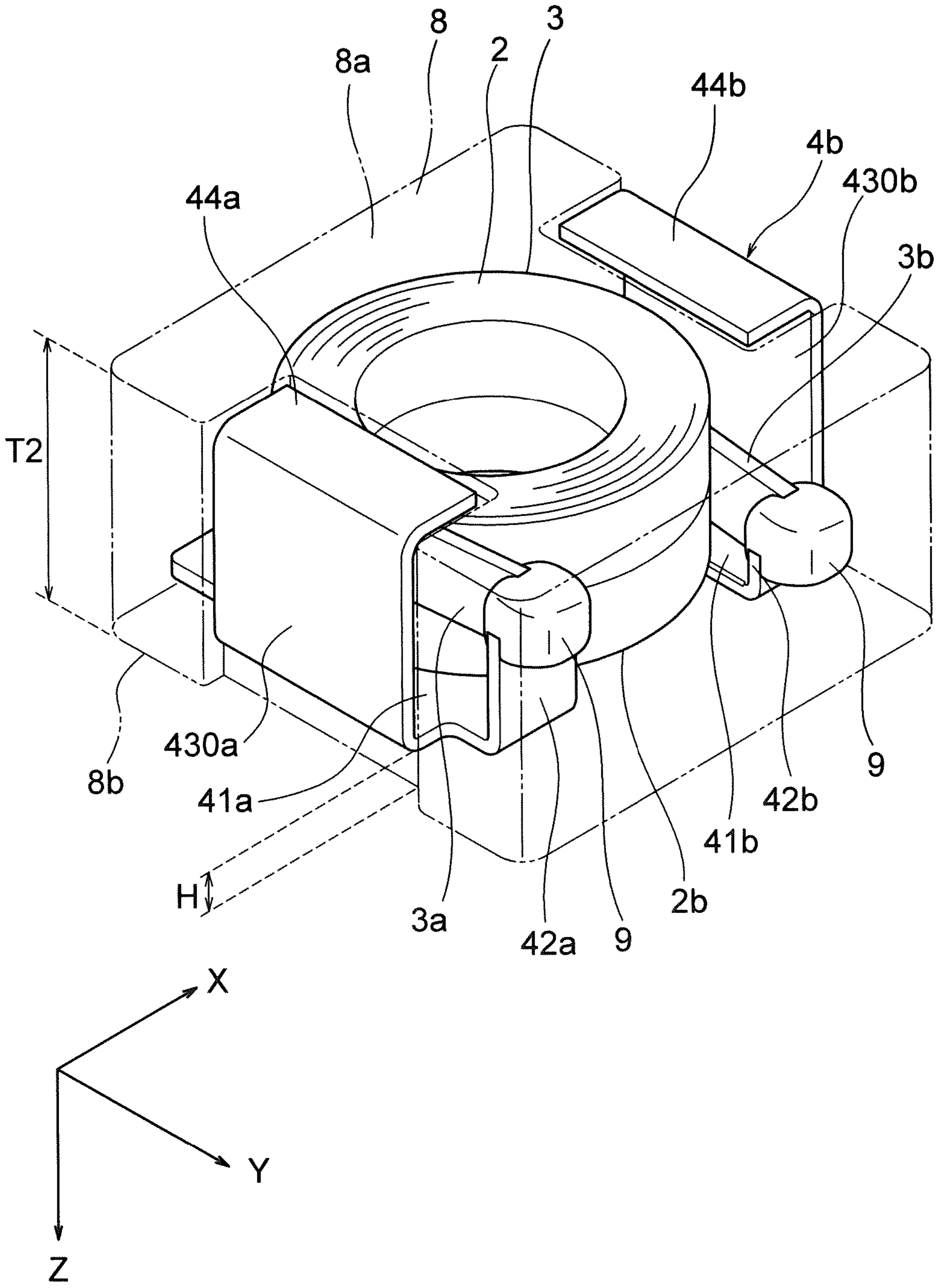
FIG. 2 is a perspective view showing an internal configuration of the coil device shown in FIG. 1.

As shown in FIG. 2, the inductor 1 includes a coil 2, a pair of terminals 4*a* and 4*b*, and a core (element body) 8. FIG. 2 shows a state where the inductor 1 shown in FIG. 1 is rotated by 180° along an XZ plane, and shows that the mounting surface 8*a* of the inductor 1 is disposed on an upper side of the paper, and the opposite mounting surface 8*b* of the inductor 1 is disposed on a lower side of the paper. Hereinafter, for ease of understanding, the inductor 1 will be described with the upper side of the paper as an upper side and the lower side of the paper as a lower side.

Dimensions of the inductor 1 are not particularly limited, and a width in an X-axis direction is preferably 2 mm to 20 mm, a width in a Y-axis direction is preferably 2 mm to 20 mm, and a width in the Z-axis direction is preferably 1 mm to 10 mm.

Figure 3:
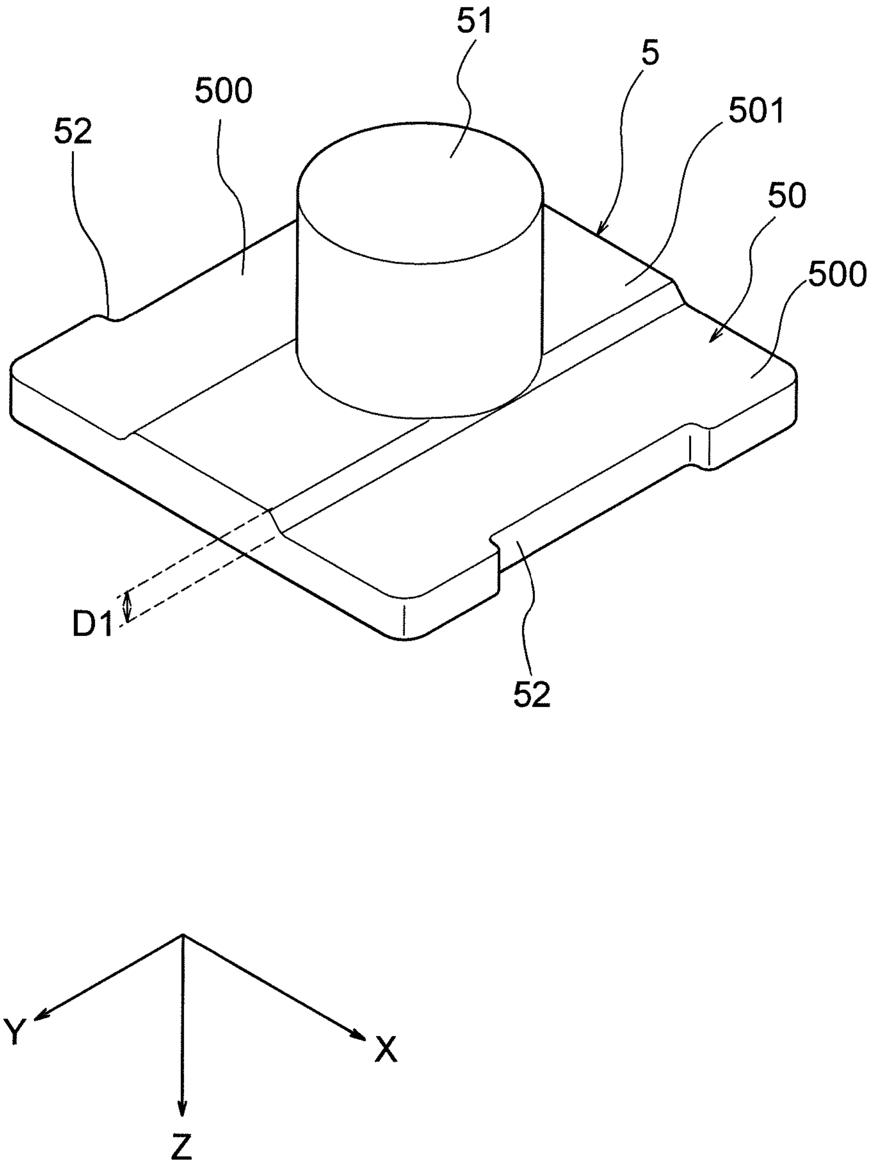
FIG. 3 is a perspective view showing a configuration of a first core used in formation of an element body of the coil device shown in FIG. 1.
Figure 4:
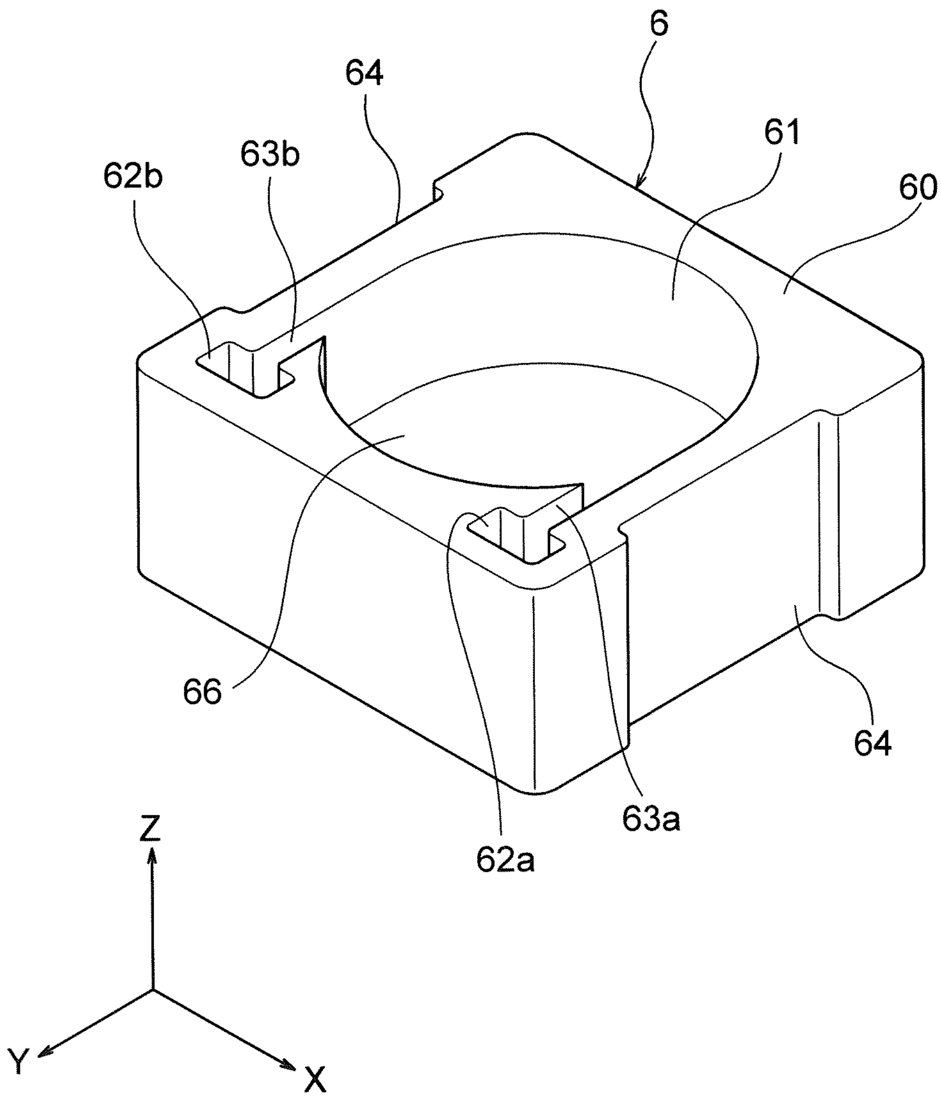
FIG. 4 is a perspective view showing a configuration of a second core used in formation of the element body of the coil device shown in FIG. 1.

The core 8 is made of a mixture containing magnetic powder and a binder resin, and is formed by combining a first core 5 shown in FIG. 3 and a second core 6 shown in FIG. 4. That is, the core 8 is formed by compression-molding the first core 5 and the second core 6, which are molded in advance, in a mold and integrating the first core 5 and the second core 6. In a joint portion between the first core 5 and the second core 6, a boundary portion cannot be identified, and the first core 5 and the second core 6 are integrally formed. Hereinafter, configurations of the first core 5 and the second core 6 will be described.

As shown in FIG. 3, the first core 5 includes a core base portion 50 and a columnar portion 51 formed on a surface (upper surface) of the core base portion 50. The first core 5 mainly forms a part of the core 8 shown in FIG. 2 on an opposite mounting surface 8*b* side.

The first core 5 is made of a synthetic resin in which ferrite particles or metal magnetic particles are dispersed. However, the material constituting the first core 5 is not limited thereto, and the first core 5 may be made of a synthetic resin that does not contain these particles. Examples of the ferrite particles include Ni—Zn ferrite and Mn—Zn ferrite. The metal magnetic particles are not particularly limited, and examples thereof include Fe—Ni alloy powder, Fe—Si alloy powder, Fe—Si—Cr alloy powder, Fe—Co alloy powder, Fe—Si—Al alloy powder, and amorphous iron.

The synthetic resin contained in the first core 5 is not particularly limited, and is preferably an epoxy resin, a phenol resin, a polyester resin, a polyurethane resin, a polyimide resin, and a silicon resin.

The core base portion 50 has a substantially rectangular parallelepiped shape (substantially flat shape), and in a state where the first core 5 is combined with the second core 6 (FIG. 4), a lower surface of the core base portion 50 forms the opposite mounting surface 8*b* of the core 8 shown in FIGS. 1 and 2. Two stepped portions 500 and a stepped upper portion 501 located between the stepped portions 500 are formed on the surface (upper surface) of the core base portion 50. The stepped upper portion 501 forms an upper surface of the step with respect to the stepped portions 500, and the columnar portion 51 is formed on the stepped upper portion 501. A width of the stepped upper portion 501 in the Y-axis direction coincides with a width of the core base portion 50 in the Y-axis direction, and the stepped upper portion 501 is formed from one end to the other end of the core base portion 50 in the Y-axis direction. A ratio of a width of the stepped upper portion 501 in the X-axis direction to a width of the core base portion 50 in the X-axis direction is preferably ¼ to ½.

The stepped portion 500 on one end is formed on the core base portion 50 on the X-axis negative direction side with respect to the columnar portion 51. The stepped portion 500 on the other end is formed on the core base portion 50 on the X-axis positive direction side with respect to the columnar portion 51. The stepped portions 500 have a similar shape when viewed from the Z-axis direction, and each have a substantially rectangular shape having a predetermined length in the X-axis direction and the Y-axis direction.

A width of each stepped portion 500 in the Y-axis direction coincides with the width of the core base portion 50 in the Y-axis direction, and each stepped portion 500 is formed from one end to the other end of the core base portion 50 in the Y-axis direction. A width of the stepped portion 500 on one end in the X-axis direction is substantially equal to a distance from an end portion of the columnar portion 51 on the X-axis negative direction side to an end portion of the core base portion 50 on the X-axis negative direction side, and the stepped portion 500 on one end is formed in the X-axis direction from a position at the end portion of the columnar portion 51 on the X-axis negative direction side to the end portion of the core base portion 50 on the X-axis negative direction side. A width of the stepped portion 500 on the other end in the X-axis direction is substantially equal to a distance from an end portion of the columnar portion 51 on the X-axis positive direction side to an end portion of the core base portion 50 on the X-axis positive direction side, and the stepped portion 500 on the other end is formed in the X-axis direction from a position at the end portion of the columnar portion 51 on the X-axis positive direction side to the end portion of the core base portion 50 on the X-axis positive direction side.

Figure 6:
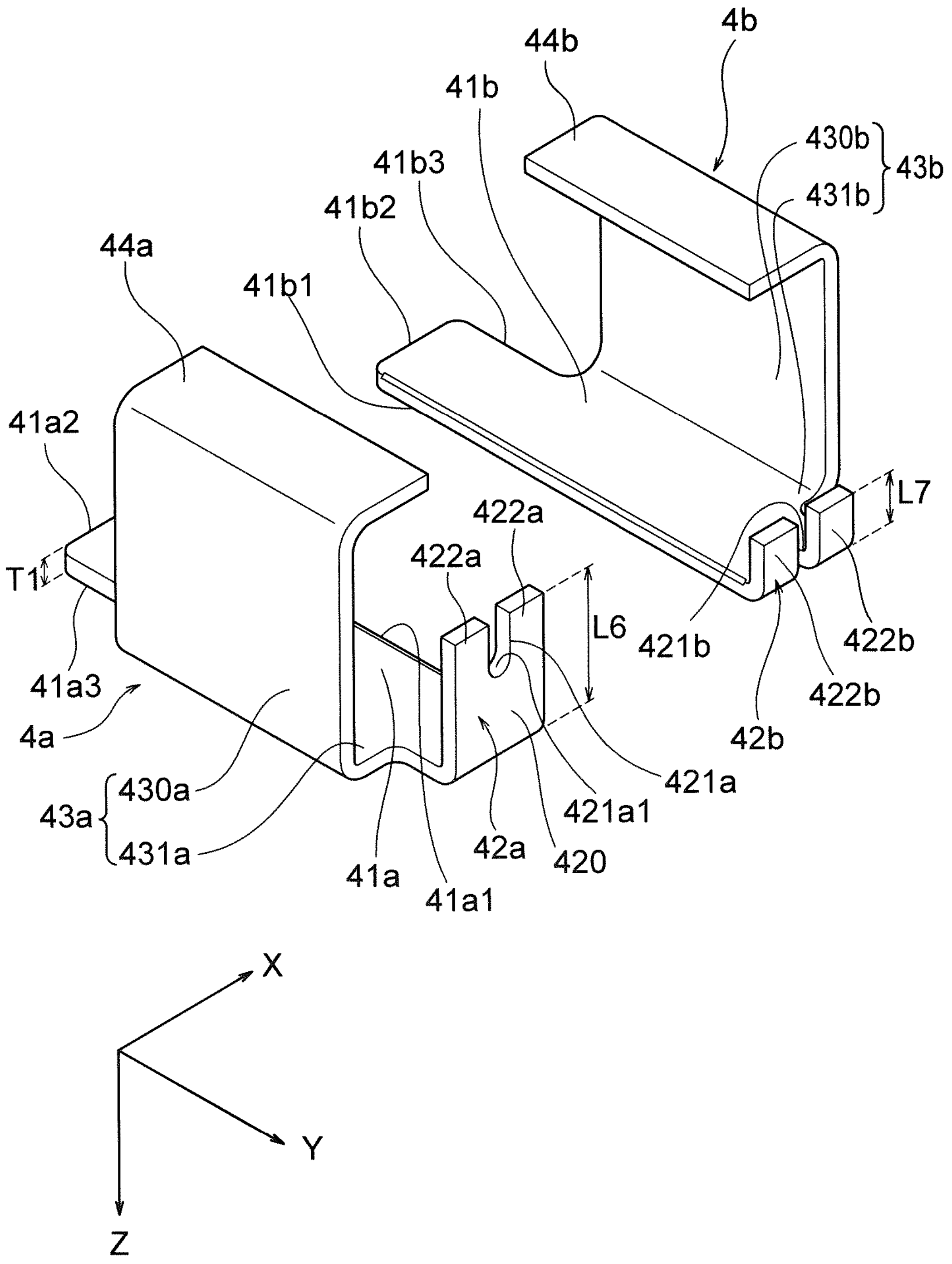
FIG. 6 is a perspective view showing a configuration of a pair of terminals shown in FIG. 2.

At the time of manufacturing the inductor 1, base portions 41*a* and 41*b* of the terminals 4*a* and 4*b* shown in FIG. 6 are disposed on the stepped portions 500, and accordingly the terminals 4*a* and 4*b* can be positioned with respect to the base portions 41*a* and 41*b* at positions of stepped portions 500. Further, by disposing the base portions 41*a* and 41*b* of the terminals 4*a* and 4*b* on the stepped portions 500, it is possible to prevent the positional deviation of the terminals 4*a* and 4*b*.

From the viewpoint of effectively performing such positioning, a depth D1 of the stepped portion 500 along the Z-axis direction is determined based on a thickness T1 (FIG. 6) of each of the base portions 41*a* and 41*b*, and a ratio D1/T1 of the depth D1 to the thickness T1 is preferably $1/8 \leq D1/T1 \leq 2$, and more preferably $1/4 \leq D1/T1 \leq 1$. In particular, the depth D1 of the stepped portion 500 along the Z-axis direction is preferably substantially equal to the thickness T1 of each of the base portions 41*a* and 41*b* such that the surfaces (upper surfaces) of the base portions 41*a* and 41*b* and the surface of the stepped upper portion 501 are flush with each other when the base portions 41*a* and 41*b* are disposed on the stepped portions 500.

A first recessed portion 52 is formed in each side surface of the core base portion 50 in the X-axis direction. Connecting portions 43*a* and 43*b* of the terminals 4*a* and 4*b* shown in FIG. 6 are disposed in the first recessed portions 52. A depth of the first recessed portion 52 along the X-axis direction is not particularly limited, and is about the same as or larger than a thickness of each of the connecting portions 43*a* and 43*b* shown in FIG. 6. A depth of each of the first recessed portions 52 along the X-axis direction is preferably a depth such that surfaces of the connecting portions 43*a* and 43*b* do not protrude from the first recessed portions 52 when the connecting portions 43*a* and 43*b* are disposed in the first recessed portions 52. A width of the first recessed portion 52 in the Y-axis direction is preferably ⅓ to ¾ of the width of the core base portion 50 in the Y-axis direction, and is preferably substantially equal to a width of each of the connecting portions 43*a* and 43*b* shown in FIG. 6 in the Y-axis direction.

The columnar portion 51 is formed integrally with a substantially central portion of the core base portion 50, and extends along the Z-axis direction. More specifically, a position (axial center) of the columnar portion 51 is disposed to be displaced by a predetermined distance to the Y-axis negative direction side with respect to the center of the core base portion 50.

Figure 5:
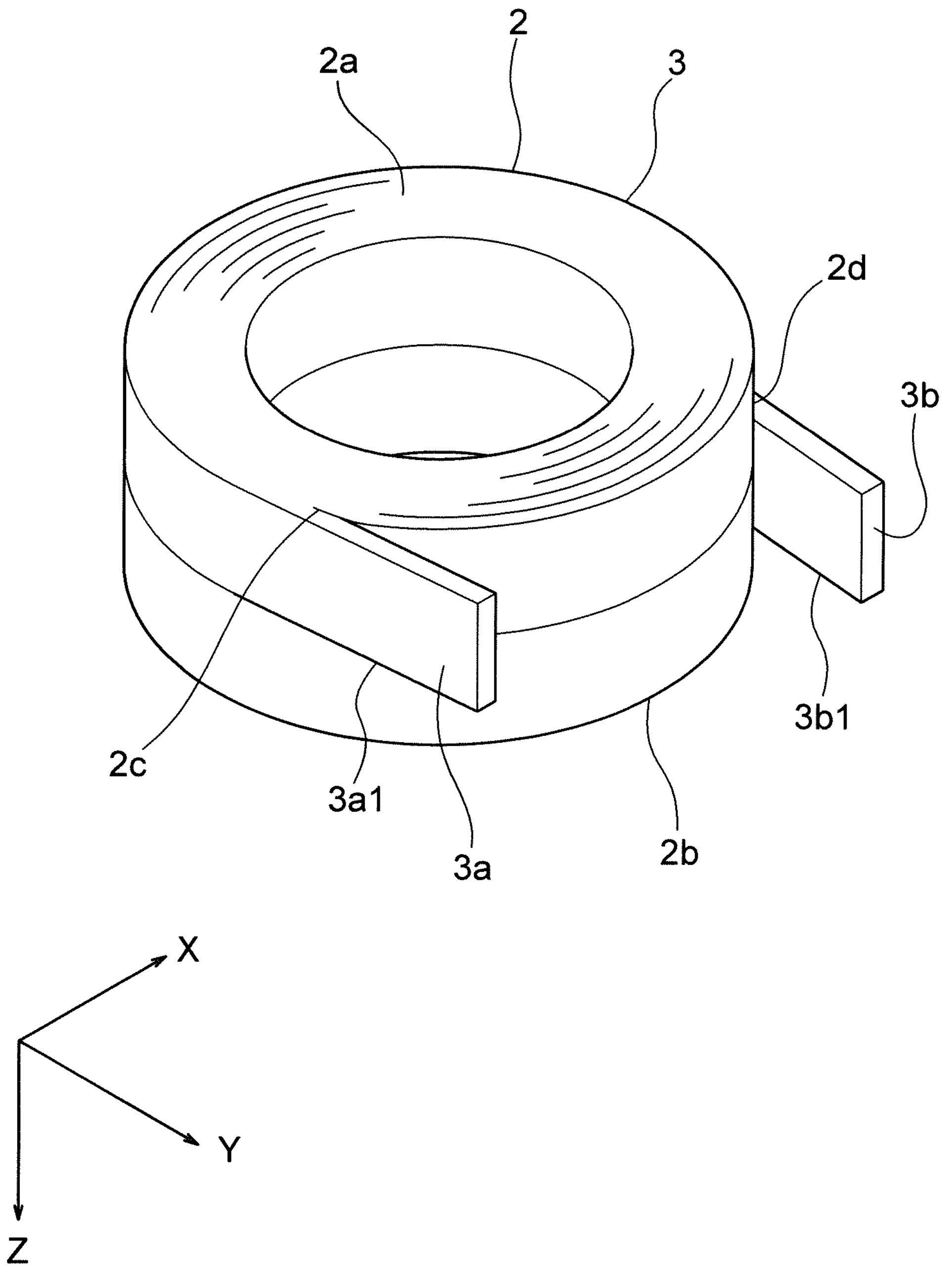
FIG. 5 is a perspective view showing a configuration of the coil shown in FIG. 2.

The coil (air core coil) 2 shown in FIG. 5 is disposed (inserted or wound) in the columnar portion 51. Therefore, a diameter of the columnar portion 51 is smaller than an inner diameter of the coil 2. In addition, as described above, since the position of the columnar portion 51 is displaced to the Y-axis negative direction side with respect to the center of the core base portion 50, a center (winding axis) of the coil 2 is displaced to the Y-axis negative direction side with respect to the center of the core 8 shown in FIG. 2 in a state where the first core 5 is combined with the second core 6 (FIG. 4).

It is preferable that the columnar portion 51 has a cylindrical shape and a height thereof is higher than a height of the coil 2. By providing the columnar portion 51 on the first core 5, the effective magnetic permeability of the first core 5 in a region on an inner side of the coil 2 can be sufficiently ensured, and the inductance characteristics of the inductor 1 can be improved.

As shown in FIG. 4, the second core 6 has a substantially quadrangular ring shape, is to be placed on a surface (upper surface) of the first core 5 shown in FIG. 3, and is to be combined with the first core 5 to which the coil 2 is attached. The second core 6 may be made of a material as same as that of the first core 5, or may be made of a material different from that the first core 5. The second core 6 includes a main body portion 60, an accommodation hole 61, terminal accommodation grooves 62*a* and 62*b*, coupling grooves 63*a* and 63*b*, second recessed portions 64, third recessed portions 65 (FIG. 9C), and a bottom portion 66. The second core 6 mainly forms a part of the core 8 shown in FIG. 2 on the mounting surface 8*a* side.

The main body portion 60 has a bottomed tubular shape, and an appearance shape of the main body portion 60 is a substantially rectangular parallelepiped shape. A thickness of the main body portion 60 in the Z-axis direction is larger than the thickness of the core base portion 50 shown in FIG. 3 in the Z-axis direction. A width of the main body portion 60 in the X-axis direction substantially coincides with the width of the core base portion 50 in the X-axis direction, and a width of the main body portion 60 in the Y-axis direction substantially coincides with the width of the core base portion 50 in the Y-axis direction. When the first core 5 is combined with the second core 6, an upper surface (a surface opposite to the bottom portion 66) of the main body portion 60 is connected to the surface (upper surface) of the core base portion 50 of the first core 5.

The accommodation hole 61 is formed in a substantially central portion of the main body portion 60, and extends from a surface on one surface (upper surface) toward the other surface (bottom portion 66) of the main body portion 60 in the Z-axis direction. The shape of an opening portion of the accommodation hole 61 is a substantially circular shape, and substantially coincides with an outer peripheral shape of the coil 2 shown in FIG. 5. An end portion of the accommodation hole 61 opposite to the opening portion is closed by the bottom portion 66. The columnar portion 51 (FIG. 3) of the first core 5 to which the coil 2 is attached is to be accommodated in the accommodation hole 61.

The bottom portion 66 forms a lower surface of the main body portion 60. In a state where the columnar portion 51 is accommodated in the accommodation hole 61 (that is, a state where the second core 6 is combined with the first core 5), the bottom portion 66 forms the mounting surface 8*a* of the core 8 shown in FIGS. 1 and 2. That is, in FIG. 4, the mounting portions 44*a* and 44*b* of the terminals 4*a* and 4*b* are disposed on a surface of the bottom portion 66 on the Z-axis negative direction side.

The second recessed portion 64 is formed in each side surface of the main body portion 60 in the X-axis direction. The connecting portions 43*a* and 43*b* of the terminals 4*a* and 4*b* shown in FIG. 6 are disposed in the second recessed portions 64. A depth of the second recessed portion 64 along the X-axis direction is the same as the depth of the first recessed portion 52 shown in FIG. 3 along the X-axis direction. Further, a width of the second recessed portion 64 in the Y-axis direction is the same as the width of the first recessed portion 52 in the Y-axis direction. In a state where the second core 6 is combined with the first core 5, the second recessed portions 64 are connected to the first recessed portions 52 along the Z-axis direction. Accordingly, as shown in FIG. 1, a side recessed portion 80 is formed on each side surface of the core 8 in the X-axis direction so as to extend from one end to the other end in the Z-axis direction.

Figure 9A:
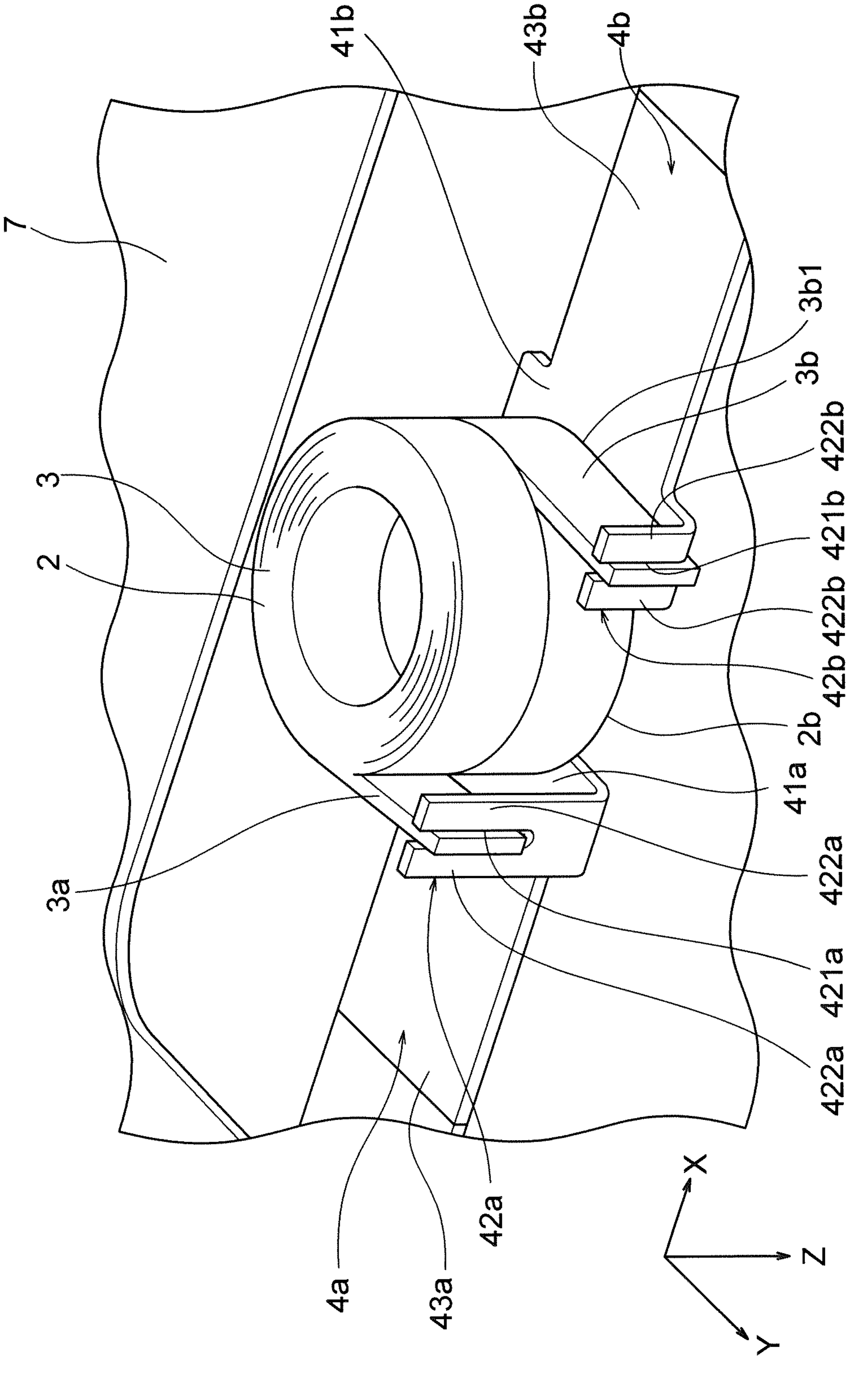
FIG. 9A is a diagram showing a method of manufacturing the coil device shown in FIG. 1.
Figure 9B:
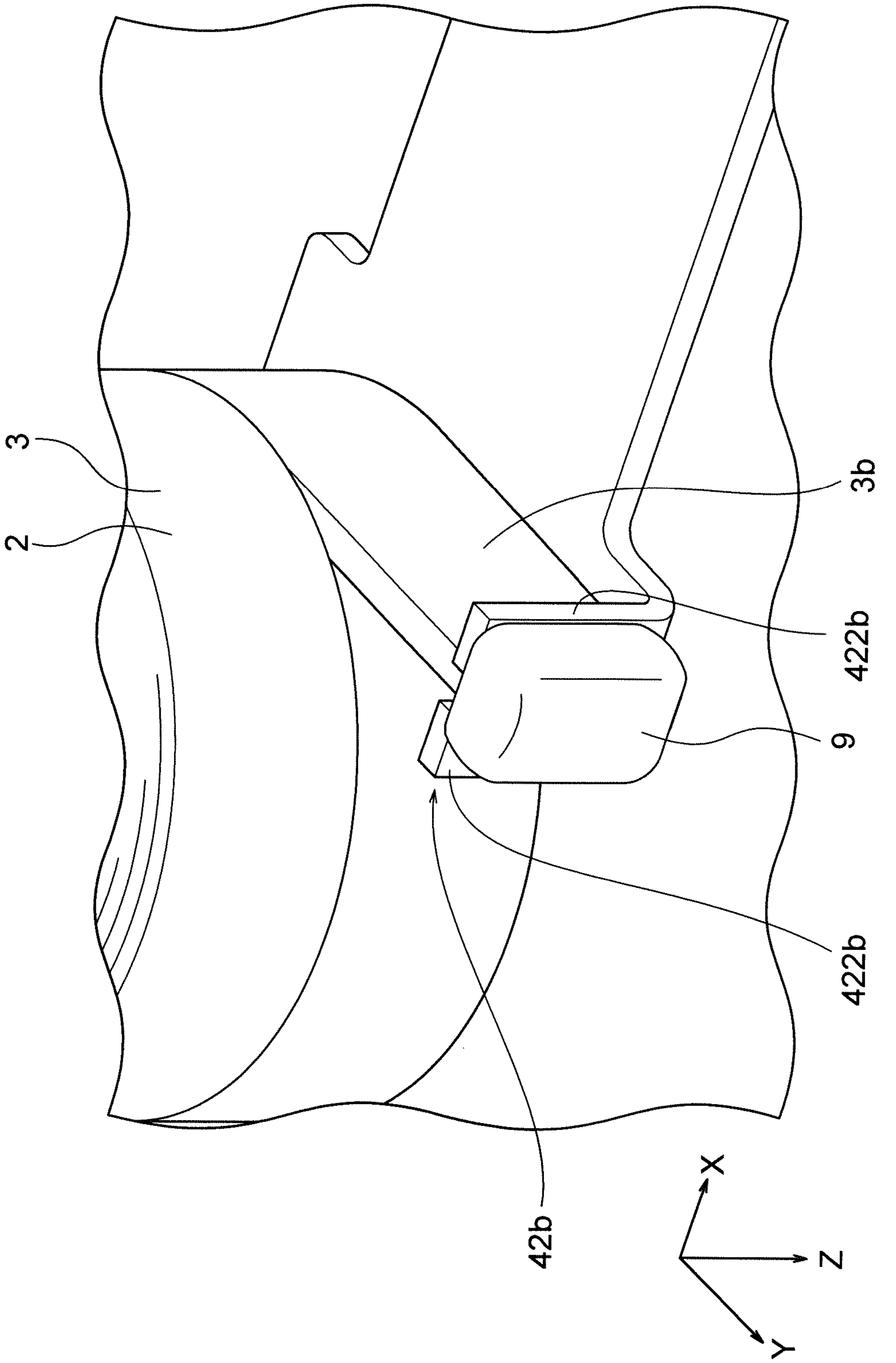
FIG. 9B is a diagram showing a step subsequent to FIG. 9A.
Figure 9C:
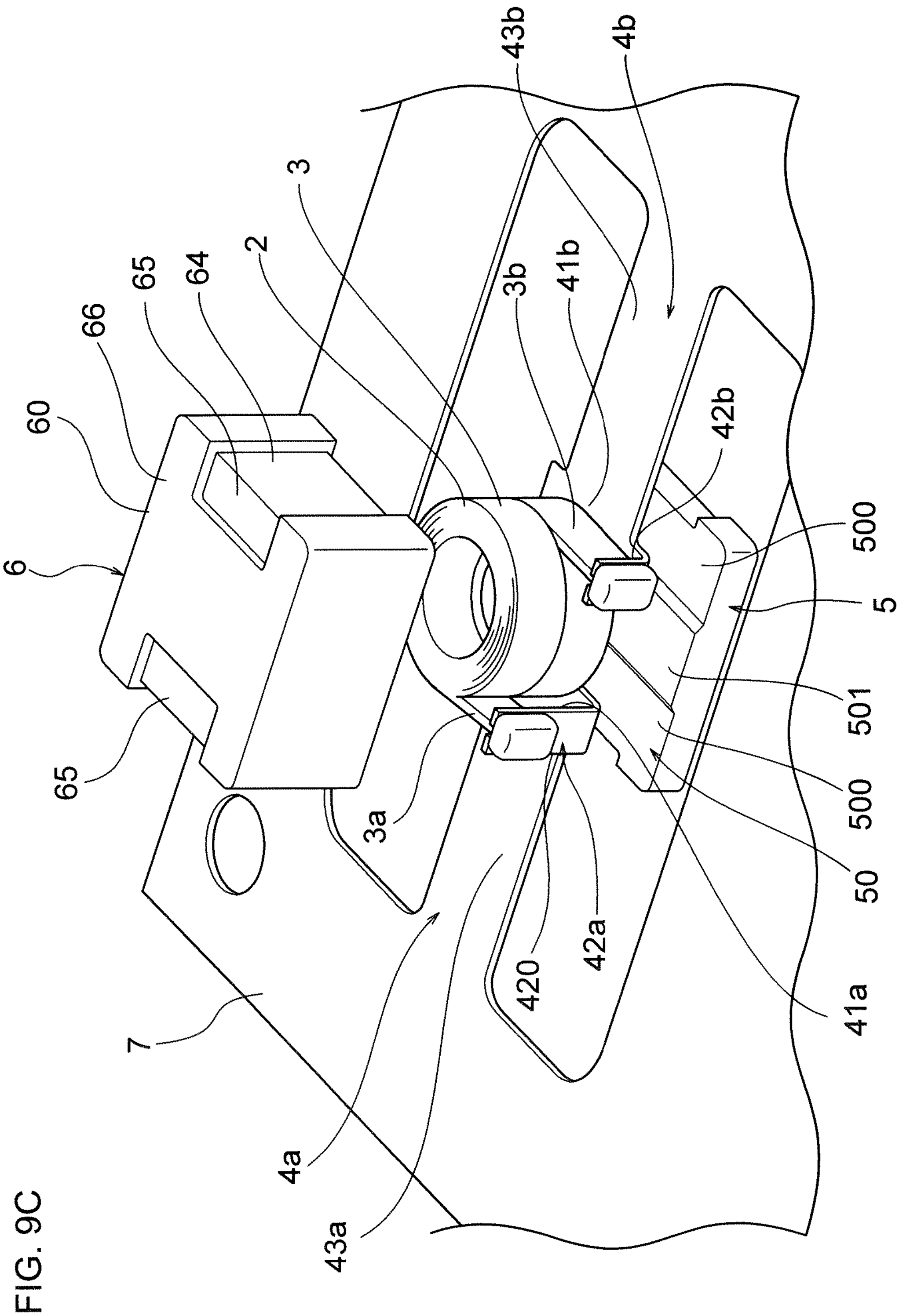
FIG. 9C is a diagram showing a step subsequent to FIG. 9B.

As shown in FIG. 9C, the third recessed portions 65 are formed in the surface (outer surface) of the bottom portion 66. Two third recessed portions 65 are formed in the bottom portion 66, and each of the third recessed portions 65 is formed continuously with each of the second recessed portions 64 formed in each of the side surfaces of the main body portion 60 in the X-axis direction. The third recessed portions 65 and the second recessed portions 64 intersect so as to be orthogonal to each other at a corner portion of the main body portion 60, and the third recessed portion 65 extends from an end portion of the second recessed portion 64 in the Z-axis direction toward the center of the bottom portion 66.

As shown in FIG. 4, the terminal accommodation grooves 62*a* and 62*b* are formed at corner portions of the main body portion 60. The terminal accommodation groove 62*a* is formed at a corner portion formed at a position where the surface on the Y-axis positive direction side and the surface on the X-axis positive direction side of the main body portion 60 intersect each other, and the terminal accommodation groove 62*b* is formed at a corner portion formed at a position where the surface on the Y-axis positive direction side and the surface on the X-axis negative direction side of the main body portion 60 intersect each other.

The terminal accommodation grooves 62*a* and 62*b* extend from one surface (upper surface) toward the other end surface (bottom portion 66) of the main body portion 60 in the Z-axis direction. The shapes of opening portions of the terminal accommodation grooves 62*a* and 62*b* are substantially rectangular shapes. In a state where the second core 6 is combined with the first core 5 shown in FIG. 3, it is possible to accommodate a wire connecting portion 42*a* of the terminal 4*a* shown in FIG. 2 inside the terminal accommodation groove 62*a*. The wire connecting portion 42*a* in a state where a lead-out portion 3*a* of a wire 3 is connected via a molten material 9 is accommodated in the terminal accommodation groove 62*a*, and a space having a size enabling accommodation of the molten material 9 is formed inside the terminal accommodation groove 62*a*.

Further, in a state where the second core 6 is combined with the first core 5 shown in FIG. 3, it is possible to accommodate the wire connecting portion 42*b* of the terminal 4*b* shown in FIG. 2 inside the terminal accommodation groove 62*b*. The wire connecting portion 42*b* in a state where a lead-out portion 3*b* of the wire 3 is connected via the molten material 9 is accommodated in the terminal accommodation groove 62*b*, and a space having a size enabling accommodation of the molten material 9 is formed inside the terminal accommodation groove 62*b*.

A width of each of the terminal accommodation grooves 62*a* and 62*b* in the X-axis direction is larger than a width of each of the wire connecting portions 42*a* and 42*b* shown in FIG. 2 in the X-axis direction. A width of each of the terminal accommodation grooves 62*a* and 62*b* in the Y-axis direction is larger than a width of each of the molten materials 9 adhering to the wire connecting portions 42*a* and 42*b* shown in FIG. 2 in the Y-axis direction. A depth of each of the terminal accommodation grooves 62*a* and 62*b* along the Z-axis direction is a depth enabling accommodation of the entire wire connecting portions 42*a* and 42*b* of the terminals 4*a* and 4*b*, and is at least larger than a length of each of the wire connecting portions 42*a* and 42*b* in the Z-axis direction. As shown in FIG. 2, the length of the wire connecting portion 42*a* along the Z-axis direction is longer than the length of the wire connecting portion 42*b* along the Z-axis direction, and accordingly, a length of the terminal accommodation groove 62*a* along the Z-axis direction may be longer than a length of the terminal accommodation groove 62*b* along the Z-axis direction.

Each of the coupling grooves 63*a* and 63*b* extends from one surface (upper surface) toward the other surface (bottom portion 66) of the main body portion 60 in the Z-axis direction. Further, each of the coupling grooves 63*a* and 63*b* extends along the Y-axis direction and couples the accommodation hole 61 to the terminal accommodation grooves 62*a* and 62*b*. The coupling groove 63*a* is connected to an end portion of the accommodation hole 62 on the X-axis positive direction side, and the coupling groove 63*b* is connected to an end portion of the accommodation hole 62 on the X-axis negative direction side.

In a state where the second core 6 is combined with the first core 5 shown in FIG. 3, the lead-out portion 3*a* of the wire 3 shown in FIG. 2 is accommodated inside the coupling groove 63*a*, and the lead-out portion 3*b* of the wire 3 is accommodated in the coupling groove 63*b*. A width of the coupling groove 63*a* in the X-axis direction is larger than a width of the lead-out portion 3*a* in the X-axis direction, and a width of the coupling groove 63*b* in the X-axis direction is larger than a width of the lead-out portion 3*b* in the X-axis direction. A depth of each of the coupling grooves 63*a* and 63*b* along the Z-axis direction is set to a depth enabling accommodation of the entire lead-out portions 3*a* and 3*b*. As shown in FIG. 2, a length of the lead-out portion 3*a* in the Z-axis direction is longer than a length of the lead-out portion 3*b* in the Z-axis direction, and accordingly, a length of the coupling groove 63*a* in the Z-axis direction may be longer than a length of the coupling groove 63*b* in the Z-axis direction.

As shown in FIG. 5, the coil 2 is a flatwise coil. The coil 2 is formed by winding the wire 3 formed of a flat wire by a round(s), and includes two layers along the Z-axis direction. A winding axis direction of the coil 2 corresponds to the Z-axis direction. The wire 3 is wound such that two relatively wide surfaces of four side surfaces constituting an outer surface of the flat wire face an inner peripheral side and an outer peripheral side of the coil 2. The coil 2 formed of an edgewise coil may be formed by winding two surfaces having a relatively narrow width of the four side surfaces constituting the outer surface of the flat wire so as to face the inner peripheral side and the outer peripheral side of the coil 2.

The coil 2 is an air core coil, and the coil 2 is attached to the first core 5 such that the columnar portion 51 of the first core 5 shown in FIG. 3 passes through the inside of the coil 2 at the time of manufacturing the inductor 1. In a state where the second core 6 is assembled to the first core 5 and the first core 5 and the second core 6 are compressed, the coil 2 is embedded inside the core 8 as shown in FIG. 2.

Examples of the material constituting the wire 3 include a good conductor, for example, a metal such as copper, a copper alloy, silver, or nickel, but the material is not particularly limited as long as the material is a conductive material. The wire 3 is an insulating coated wire, and the surface of the wire 3 is coated with an insulating coating. The resin constituting the insulating coating is not particularly limited, and for example, a polyamide-imide resin or a urethane resin is used. Further, as the wire 3, a self-fusing wire having a fusing coating on the outer side of the insulating coating may be used. The resin constituting a fusing coating is not particularly limited, and for example, a polyamide resin or an epoxy resin is used.

As shown in FIG. 5, in the second layer (second stage) of the coil 2, the lead-out portion 3*a* of the wire 3 is led out to the outside from a first lead-out position 2*c* of the coil 2, and linearly extends along the Y-axis direction. In the first layer (first stage) of the coil 2, the lead-out portion 3*b* of the wire 3 is led out to the outside from a second lead-out position 2*d* of the coil 2, and linearly extends along the Y-axis direction. The lead-out portions 3*a* and 3*b* are led out in the same direction (Y-axis direction) without being twisted. The first lead-out position 2*c* and the second lead-out position 2*d* are displaced from each other along the Z-axis direction, and the lead-out portions 3*a* and 3*b* are disposed to be displaced from each other along the Z-axis direction.

The lead-out portions 3*a* and 3*b* of the wire 3 are connected to the wire connecting portions 42*a* and 42*b* of the terminals 4*a* and 4*b* shown in FIG. 2. In the state shown in FIG. 5, the lead-out portions 3*a* and 3*b* are led out along the Y-axis direction. Alternatively, in a state of being connected to the wire connecting portions 42*a* and 42*b*, the lead-out portions 3*a* and 3*b* extend in a direction inclined inward with respect to the Y-axis direction.

As shown in FIG. 6, the terminal 4*a* includes the base portion 41*a*, the wire connecting portion 42*a*, the connecting portion 43*a*, and the mounting portion 44*a*. The terminal 4*b* includes the base portion 41*b*, the wire connecting portion 42*b*, the connecting portion 43*b*, and the mounting portion 44*b*. The terminals 4*a* and 4*b* are formed by machining a conductive plate material such as a metal, but the method of forming the terminals 4*a* and 4*b* is not limited thereto.

The base portions 41*a* and 41*b* each have a flat plate shape extending in a direction substantially orthogonal to the winding axis direction of the coil 2 (that is, the X-axis direction and the Y-axis direction). The base portions 41*a* and 41*b* include inner edge portions 41*a*1 and 41*b*1, side edge portions 41*a*2 and 41*b*2, and outer edge portions 41*a*3 and 41*b*3, respectively. The inner edge portions 41*a*1 and 41*b*1 are edge portions respectively in inner sides of the base portions 41*a* and 41*b* in the X-axis direction, and linearly extend along the Y-axis direction. The inner edge portion 41*a*1 and the inner edge portion 41*b*1 are disposed to face each other.

The side edge portions 41*a*2 and 41*b*2 are edge portions of the base portions 41*a* and 41*b* in the Y-axis direction, and are located to be opposite to the wire connecting portions 42*a* and 42*b* along the Y-axis direction. The side edge portions 41*a*2 and 41*b*2 each linearly extend along the X-axis direction. The side edge portions 41*a*2 and 41*b*2 are located on the outer side in the Y-axis direction with respect to positions of the end portions of the connecting portions 43*a* and 43*b* on the Y-axis negative direction side.

The outer edge portions 41*a*3 and 41*b*3 are edge portions on the outer side in the X-axis direction with respect to the base portions 41*a* and 41*b*, and face the side on which the side surface of the core 8 is located. The outer edge portions 41*a*3 and 41*b*3 extend substantially parallel to the inner edge portions 41*a*1 and 41*b*1.

The base portions 41*a* and 41*b* are disposed inside the core 8 shown in FIG. 2. Each of the base portions 41*a* and 41*b* has a substantially rectangular shape when viewed in the Z-axis direction. At the time of manufacturing the inductor 1, the base portions 41*a* and 41*b* are placed on the stepped portions 500 of the core base portion 50 of the first core 5 shown in FIG. 3 at a predetermined interval along the X-axis direction. The interval between the base portion 41*a* and the base portion 41*b* corresponds to a distance between the stepped portions 500 along the X-axis direction, that is, the width of the stepped upper portion 501 in the X-axis direction.

Since the base portions 41*a* and 41*b* are disposed on the surfaces of the stepped portions 500, in a state where the second core 6 shown in FIG. 4 is combined with the first core 5 (that is, in a state where the core 8 shown in FIG. 2 is formed), the base portions 41*a* and 41*b* are disposed at positions separated from the opposite mounting surface 8*b* of the core 8 by the thickness of the stepped portion 500 in the Z-axis direction.

A ratio H/T2 of a height H of each of the base portions 41*a* and 41*b* in the Z-axis direction from the opposite mounting surface 8*b* of the core 8 to a thickness T2 of the core 8 in the Z-axis direction is preferably $\frac{1}{15}$ to $\frac{1}{2}$, and more preferably $\frac{1}{8}$ to $\frac{1}{3}$. By setting the value of H/T2 in such a range, a part of the core 8 located between the base portions 41*a* and 41*b* and the opposite mounting surface 8*b* of the core 8 is provided with an appropriate thickness, and it is possible to prevent a problem such as occurrence of a crack in the part.

As shown in FIG. 2, the coil 2 is placed on the upper surfaces of the base portions 41*a* and 41*b*. More specifically, a second end portion 2*b* in the winding axis direction of the coil 2 is provided on the upper surfaces of the base portions 41*a* and 41*b*, and the second end portion 2*b* and the base portions 41*a* and 41*b* are in contact with each other. When the opposite mounting surface 8*b* is used as a reference, the position of the second end portion 2*b* of the coil 2 in the Z-axis direction is above the positions of bottom surfaces of the base portions 41*a* and 41*b* in the Z-axis direction by the thickness of each of the base portions 41*a* and 41*b*, and a step is formed between the second end portion 2*b* of the coil 2 and the bottom surfaces of the base portions 41*a* and 41*b*.

Figure 8:
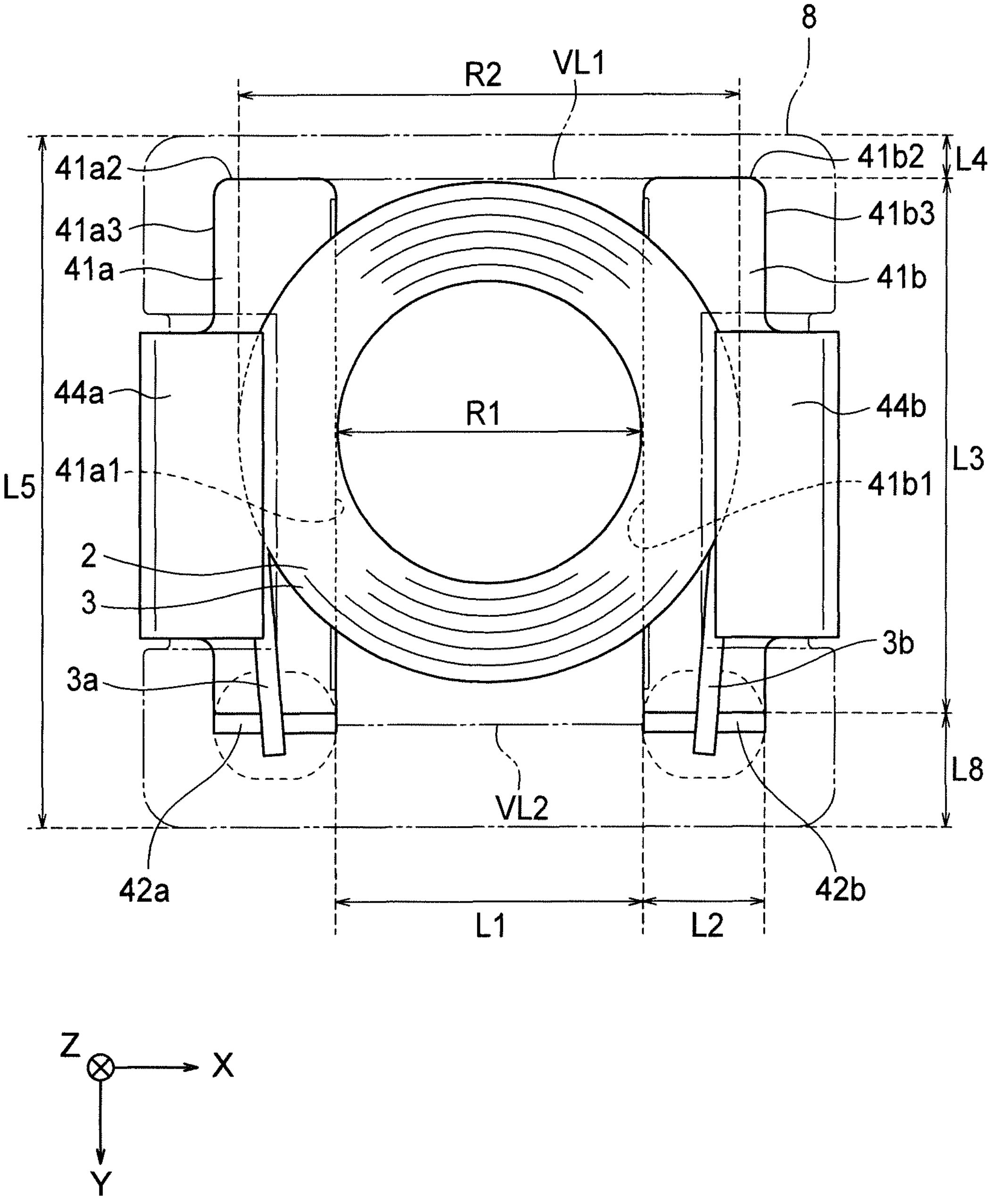
FIG. 8 is a plan view showing the configuration of the coil device shown in FIG. 2.

As shown in FIG. 8, in a state where the second end portion 2*b* of the coil 2 is provided on the base portions 41*a* and 41*b*, the inner edge portions 41*a*1 and 41*b*1 of the base portions 41*a* and 41*b* are located between an outer peripheral surface and an inner peripheral surface of the coil 2. With such a configuration, it is possible to dispose the second end portion 2*b* of the coil 2 on the base portions 41*a* and 41*b* in a stable state. In addition, since the inner edge portions 41*a*1 and 41*b*1 of the base portions 41*a* and 41*b* are not disposed in a passage of a magnetic flux passing through the inner peripheral side of the coil 2, it is possible to favorably ensure the passage of the magnetic flux to realize the coil device having favorable inductance characteristics.

In order to enable the above-mentioned disposition, a relation among the distance L1 between the base portion 41*a* and the base portion 41*b* in the X-axis direction, an inner diameter R1 of the coil 2, and an outer diameter R2 of the coil 2 is preferably $R1 \leq L1 < R2$.

As shown in the drawings, when the distance L1 between the base portion 41*a* and the base portion 41*b* in the X-axis direction is substantially equal to the inner diameter R1 of the coil 2, a sufficient contact area between the second end portion 2*b* of the coil 2 and the base portions 41*a* and 41*b* can be ensured, and the coil 2 can be placed on the base portions 41*a* and 41*b* in a more stable state.

Further, from the viewpoint of placing the coil 2 on the base portions 41*a* and 41*b* in a stable state, a width L2 of each of the base portions 41*a* and 41*b* in the X-axis direction is preferably $L2 \geq (R2-R1)/4$, more preferably $L2 \geq (R2-R1)/2$, and particularly preferably $L2 \geq (R2-R1)/2$ and $R1 \leq L1 < R2$. In this case, in a state where the coil 2 is placed on the base portions 41*a* and 41*b*, the outer peripheral surface of the coil 2 is prevented from protruding to the outside of the outer edge portions 41*a*3 and 41*b*3 or the side edge portions 41*a*2 and 41*b*2 of the base portions 41*a* and 41*b*, and the second end portion 2*b* of the coil 2 can be supported by the base portions 41*a* and 41*b* with a sufficient supporting force.

In a state where the coil 2 is placed on the base portions 41*a* and 41*b*, the outer peripheral surface of the coil 2 is disposed on the inner side in the Y-axis direction with respect to a virtual line VL1 defined as a line connecting the side edge portion 41*a*2 of the base portion 41*a* and the side edge portion 41*b*2 of the base portion 41*b* in the X-axis direction. By placing the coil 2 on the base portions 41*a* and 41*b* such that the outer peripheral surface of the coil 2 is not disposed on the outer side in the Y-axis direction with respect to the virtual line VL1, it is possible to dispose the outer peripheral surface of the coil 2 at a position sufficiently separated from the side surface of the core 8 on the Y-axis negative direction side, it is possible to sufficiently ensure the thickness of the core 8 between the outer peripheral surface of the coil 2 (the end portion of the coil 2 on the Y-axis negative direction side) and the side surface of the core 8 on the Y-axis negative direction side, and it is possible to prevent the occurrence of cracks in the side surface of the core 8 on the Y-axis negative direction side. A ratio L4/L5 of a length L4 between the side edge portions 41*a*2 and 41*b*2 and the side surface of the core 8 on the Y-axis negative direction side to a width L5 of the core 8 in the Y-axis direction is preferably $1/32$ to $1/6$, and more preferably $1/20$ to $1/10$.

Moreover, from the viewpoint of placing the coil 2 on the base portions 41*a* and 41*b* in a stable state, a length L3 of each of the base portions 41*a* and 41*b* along the Y-axis direction is preferably $L3 \geq R2/2$, and more preferably $L3 \geq R2$. The length L3 of each of the base portions 41*a* and 41*b* along the Y-axis direction is preferably longer than the length of each of the connecting portions 43*a* and 43*b* along the Y-axis direction.

In the case where $L3 \geq R2$, particularly in the Y-axis direction, it is possible to prevent the outer peripheral surface of the coil 2 from protruding to the outside of the side edge portions 41*a*2 and 41*b*2 of the base portions 41*a* and 41*b* or the wire connecting portions 42*a* and 42*b*. In addition, in the Y-axis direction, a region from one end to the other end of the coil 2 in the Y-axis direction can be disposed on the inner side of the base portions 41*a* and 41*b*, and the coil 2 can be placed on the base portions 41*a* and 41*b* in a stable state.

The width L2 of each of the base portions 41*a* and 41*b* in the X-axis direction is substantially constant along the Y-axis direction, and for example, the inner edge portions 41*a*1 and 41*b*1 of the base portions 41*a* and 41*b* are not provided with a shape such as a recessed portion. The base portions 41*a* and 41*b* continuously extend from the positions at the side edge portions 41*a*2 and 41*b*2 to the positions at the end portions on the Y-axis positive direction side to which the wire connecting portions 42*a* and 42*b* are connected.

Figure 7A:
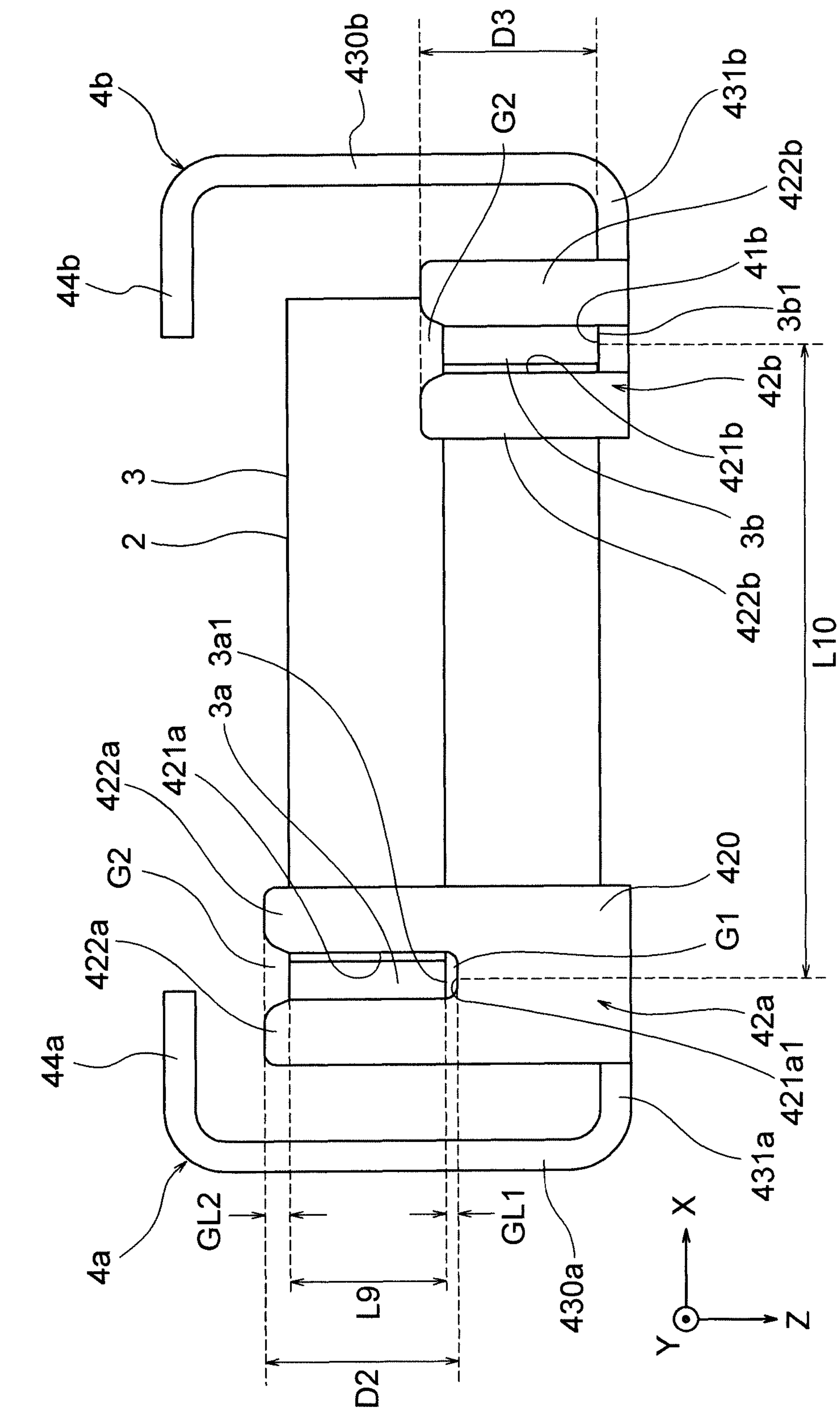
FIG. 7A is a side view showing a state where the coil is placed on a base portion of each of the pair of terminals shown in FIG. 6.
Figure 7B:
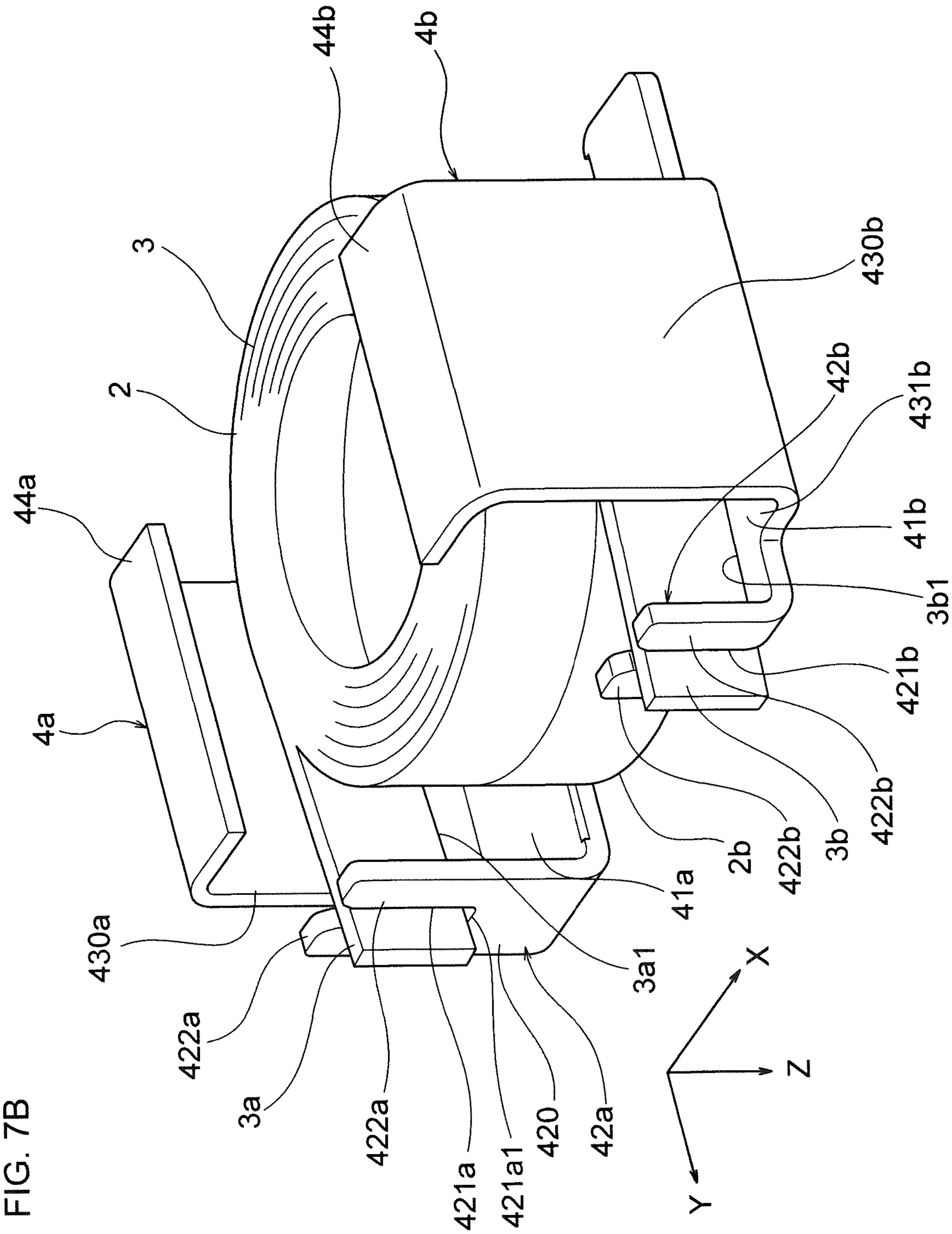
FIG. 7B is a perspective view showing a state where the pair of terminals and the coil shown in FIG. 7A are viewed from another angle.

As shown in FIG. 7B, a part of the lead-out portion 3*b* of the wire 3 is placed on the upper surface of the base portion 41*b* together with the second end portion 2*b* of the coil 2. More specifically, a lead-out bottom portion 3*b*1 of the lead-out portion 3*b* is provided on the upper surface of the base portion 41*b*, and the lead-out bottom portion 3*b*1 and the base portion 41*b* are in contact with each other. Accordingly, the lead-out bottom portion 3*b*1 of the lead-out portion 3*b* is supported by the base portion 41*b*1.

In the present embodiment, since the lead-out portion 3*b* of the wire 3 is led out from below the coil 2 (the second lead-out position 2*d* shown in FIG. 5), in a state where the second end portion 2*b* of the coil 2 is placed on the base portion 41*b*, the lead-out portion 3*b* is led out to the outer side in the Y-axis direction while the lead-out bottom portion 3*b*1 is disposed along the upper surface of the base portion 41*b*. On the other hand, since the lead-out portion 3*a* of the wire 3 is led out from above the coil 2 (the first lead-out position 2*c* shown in FIG. 5), the lead-out portion 3*a* is not placed on the upper surface of the base portion 41*a*, but is disposed at a position separated from the upper surface of the base portion 41*a* by a predetermined distance.

The lead-out portions 3*a* and 3*b* of the wire 3 are connected to the wire connecting portions 42*a* and 42*b*. As shown in FIG. 2, the wire connecting portions 42*a* and 42*b* are disposed inside the core 8. In the present embodiment, since the lead-out portions 3*a* and 3*b* are led out toward substantially the same direction (Y-axis positive direction side), the wire connecting portions 42*a* and 42*b* are disposed on the Y-axis positive direction side of the coil 2 from which the lead-out portions 3*a* and 3*b* are led out.

As shown in FIG. 6, the wire connecting portions 42*a* and 42*b* are raised from the base portions 41*a* and 41*b* along the Z-axis direction. More specifically, the wire connecting portions 42*a* and 42*b* are raised from end portions of the base portions 41*a* and 41*b* on the Y-axis positive direction side (end portions located on the opposite side of the side edge portions 41$a$2 and 41$b$2) in a state of being substantially orthogonal to the base portions 41$a$ and 41$b$, and extend along the Z-axis direction. Rising positions of the wire connecting portions 42$a$ and 42$b$ are on the outer side in the Y-axis direction with respect to the positions of the end portions of the connecting portions 43$a$ and 43$b$ on the Y-axis positive direction side. As shown in FIG. 2, since the end portions of the base portions 41$a$ and 41$b$ on the Y-axis positive direction side are disposed on the outer side along the Y-axis direction with respect to the end portions of the coil 2 in the Y-axis direction, the rising positions of the wire connecting portions 42$a$ and 42$b$ are disposed on the outer side along the Y-axis direction with respect to the end portions of the coil 2 in the Y-axis direction.

As shown in FIG. 7B, the first wire connecting portion 42$a$ and the second wire connecting portion 42$b$ extend along the Z-axis direction so as to be substantially parallel to each other at different positions in the X-axis direction. As shown in FIG. 6, a length L6 of the first wire connecting portion 42$a$ along the Z-axis direction is longer than a length L7 of the second wire connecting portion 42$b$ along the Z-axis direction. A ratio L7/L6 of the length L7 of the second wire connecting portion 42$b$ along the Z-axis direction to the length L6 of the first wire connecting portion 42$a$ along the Z-axis direction is preferably $1/4 \leq L7/L6 < 1$, and more preferably $1/3 \leq L7/L6 < 2/3$.

As shown in FIG. 8, in a state where the coil 2 is placed on the base portions 41$a$ and 41$b$, the outer peripheral surface of the coil 2 is not exposed to the outer side in the Y-axis direction with respect to a virtual line VL2 defined as a line connecting the first wire connecting portion 42$a$ and the second wire connecting portion 42$b$ in the X-axis direction, and is disposed on the inner side in the Y-axis direction with respect to the virtual line VL2. With such a configuration, it is possible to dispose the outer peripheral surface of the coil 2 at a position sufficiently separated from the side surface of the core 8 on the Y-axis positive direction side, it is possible to sufficiently ensure the thickness of the core 8 between the outer peripheral surface of the coil 2 (the end portion of the coil 2 on the Y-axis positive direction side) and the side surface of the core 8 on the Y-axis positive direction side, and it is possible to prevent the occurrence of cracks in the side surface of the core 8 on the Y-axis positive direction side.

A length L8 between the wire connecting portions 42$a$ and 42$b$ and the side surface of the core 8 on the Y-axis positive direction side along the Y-axis direction is longer than the length L4 between the side edge portions 41$a$2 and 41$b$2 of the base portions 41$a$ and 41$b$ and the side surface of the core 8 on the Y-axis negative direction side. This is because, as described above, in the present embodiment, the center of the coil 2 is displaced to the Y-axis negative direction side with respect to the center of the core 8. A ratio L8/L5 of the length L8 between the wire connecting portions 42$a$ and 42$b$ and the side surface of the core 8 on the Y-axis positive direction side along the Y-axis direction to the width L5 of the core 8 in the Y-axis direction is preferably $1/16$ to $1/4$, and more preferably $1/8$ to $1/5$.

As shown in FIG. 6, the wire connecting portion 42$a$ includes a flat plate portion 420, an accommodation recessed portion 421$a$, and a pair of protruding portions 422$a$ and 422$a$. The wire connecting portion 42$b$ includes an accommodation recessed portion 421$b$ and a pair of protruding portions 422$b$ and 422$b$.

The flat plate portion 420 has a flat plate shape parallel to the XZ plane, and extends along the Z-axis direction in a state of being substantially orthogonal to the base portion 41$a$. The flat plate portion 420 serves to connect the base portion 41$a$ and the pair of protruding portions 422$a$ and 422$a$, and by providing the flat plate portion 420 in the wire connecting portion 42$a$, a position of the accommodation recessed portion 421$a$ in the Z-axis direction can be shifted upward from the position of the base portion 41$a$. That is, the flat plate portion 420 is provided mainly for convenience of height adjustment of the accommodation recessed portion 421$a$.

The flat plate portion 420 is provided only on the wire connecting portion 42$a$, and is not provided on the wire connecting portion 42$b$. Therefore, a position of a tip end portion of the wire connecting portion 42$a$ in the Z-axis direction and a position of a tip end portion of the wire connecting portion 42$b$ in the Z-axis direction are displaced along the Z-axis direction by a distance corresponding to a height of the flat plate portion 420, and a step along the Z-axis direction is formed between the tip end portions. A height of the step corresponds to a difference between the length L6 of the wire connecting portion 42$a$ along the Z-axis direction and the length L7 of the wire connecting portion 42$b$ along the Z-axis direction.

As shown in FIG. 7B, the lead-out portion 3$a$ of the wire 3 is accommodated in the accommodation recessed portion 421$a$. The position (height in the Z-axis direction) of the accommodation recessed portion 421$a$ corresponds to the position (height in the Z-axis direction) of the first lead-out position 2$c$ (FIG. 5) of the lead-out portion 3$a$, and an accommodation bottom portion 421$a$1 of the accommodation recessed portion 421$a$ is located at a position corresponding to a substantially central portion of the coil 2 in the Z-axis direction.

The accommodation recessed portion 421$a$ is a notch formed along the Z-axis direction at a top portion of the wire connecting portion 42$a$. One end (upper end) of the accommodation recessed portion 421$a$ in the Z-axis direction is open, and the lead-out portion 3$a$ of the wire 3 can be inserted (or slid) into the accommodation recessed portion 421$a$ from this open part. As shown in FIG. 7A, a depth D2 of the accommodation recessed portion 421$a$ in the Z-axis direction is determined based on, for example, a height L9 of the lead-out portion 3$a$, and a ratio D2/L9 of the depth D2 to the height L9 is preferably $1 < D2/L9 \leq 1.5$, and more preferably $1 < D2/L9 \leq 1.3$.

When the ratio D2/L9 is set within the above-mentioned range, it is possible to form a gap G1 between a lead-out bottom portion 3$a$1 of the lead-out portion 3$a$ and the accommodation bottom portion 421$a$1 of the accommodation recessed portion 421$a$ when the lead-out portion 3$a$ of the wire 3 is accommodated in the accommodation recessed portion 421$a$. In this case, the lead-out portion 3$a$ of the wire 3 accommodated in the accommodation recessed portion 421$a$ is located above the accommodation bottom portion 421$a$1 of the accommodation recessed portion 421$a$ by a distance corresponding to a length GL1 of the gap G1 in the Z-axis direction. A ratio GL1/D2 of the length GL1 of the gap G1 to the depth D2 of the accommodation recessed portion 421$a$ is preferably $1/32$ to $1/8$, and more preferably $1/20$ to $1/10$.

With such a configuration, for example, even when the first lead-out position 2$c$ (FIG. 5) of the lead-out portion 3$a$ is displaced in the Z-axis direction (particularly, downward in the Z-axis direction) due to a manufacturing error, it is possible to connect the lead-out portion 3$a$ to the wire connecting portion 42$a$ in a state of being linearly led out without performing bending processing on the lead-out portion 3*a* when the lead-out portion 3*a* is to be accommodated in the accommodation recessed portion 421*a*.

In addition, by setting in advance the depth D2 of the accommodation recessed portion 421*a* to be relatively deep such that the gap (margin) G1 is formed between the lead-out portion 3*a* and the accommodation bottom portion 421*a*1 of the accommodation recessed portion 421*a*, it is possible to reliably accommodate the lead-out portion 3*a* in the accommodation recessed portion 421*a* without tilting the coil 2. Moreover, for example, even when a situation occurs in which the first lead-out position 2*c* (FIG. 5) of the lead-out portion 3*a* is disposed at a position different from a normal position along the Z-axis direction due to a design change or the like, it is possible to reliably accommodate the lead-out portion 3*a* in the accommodation recessed portion 421*a*.

A gap G2 is formed between an end portion of the lead-out portion 3*a* opposite to the lead-out bottom portion 3*a*1 and the top portion of the wire connecting portion 42*a* in the Z-axis direction. A length GL2 of the gap G2 in the Z-axis direction is larger than the length GL1 of the gap G1 in the Z-axis direction, but may be smaller than the length GL1. By providing the accommodation recessed portion 421*a* with the gap G2 in this manner, even when the first lead-out position 2*c* (FIG. 5) of the lead-out portion 3*a* is displaced in the Z-axis direction (particularly, upward in the Z-axis direction) due to, for example, a manufacturing error, it is possible to connect the lead-out portion 3*a* to the wire connecting portion 42*a* in a state of being linearly led out, without performing bending processing on the lead-out portion 3*a*, as described above. Moreover, it is possible to prevent the lead-out portion 3*a* from protruding to the outside of the accommodation recessed portion 421*a*, and as described later, it is possible to easily perform laser welding on a joint portion between the wire connecting portion 42*a* and the lead-out portion 3*a*. The gaps G1 and G2 are not essential, and may be omitted.

The depth D2 of the accommodation recessed portion 421*a* in the Z-axis direction may be determined based on, for example, the length L6 of the wire connecting portion 42*a* shown in FIG. 6, and a ratio D2/L6 of the depth D2 to the height L6 is preferably $1/4<D2/L6\leq 3/4$, and more preferably $3/8<D2/L6\leq 5/8$. By setting the ratio D2/L6 within the above-mentioned range, it is possible to accommodate the lead-out portion 3*a* in the accommodation recessed portion 421*a* such that a part of the lead-out portion 3*a* does not protrude to the outside from the upper end portion of the accommodation recessed portion 421*a*.

The pair of protruding portions 422*a* and 422*a* are formed so that the accommodation recessed portion 421*a* is placed between the protruding portions 422*a* and 422*a*. An extending direction of the protruding portions 422*a* and 422*a* is the same as an extending direction of the flat plate portion 420, which is the Z-axis direction. A length of each of the protruding portions 422*a*, 422*a* along the Z-axis direction corresponds to the length D2 of the accommodation recessed portion 421*a* along the Z-axis direction.

An interval between one protruding portion 422*a* and the other protruding portion 422*a* in the X-axis direction (that is, the width of the accommodation recessed portion 421*a* in the X-axis direction) is larger than a plate thickness of the lead-out portion 3*a* of the wire 3. This is to make an easier insertion of the lead-out portion 3*a* into the accommodation recessed portion 421*a*. The lead-out portion 3*a* is fixed to be sandwiched between the protruding portions 422*a* and 422*a* inside the accommodation recessed portion 421*a*.

As shown in FIG. 7B, the lead-out portion 3*b* of the wire 3 is accommodated in the accommodation recessed portion 421*b*. The position (the height in the Z-axis direction) of the accommodation recessed portion 421*b* corresponds to the position (the height in the Z-axis direction) of the second lead-out position 2*d* (FIG. 5) of the lead-out portion 3*b*.

The accommodation recessed portion 421*b* is a notch formed along the Z-axis direction at a top portion of the wire connecting portion 42*b*. However, a portion (bottom portion) of the accommodation recessed portion 421*b* bites into the end portion of the base portion 41*b* on the Y-axis positive direction side, and strictly speaking, a part of the accommodation recessed portion 421*b* is formed in the base portion 41*b* along the Y-axis direction. In this way, by forming the accommodation recessed portion 421*b* to extend to the base portion 41*b*, the pair of protruding portions 422*b* and 422*b*, which will be described later, can be easily bent (raised) in the Z-axis direction at an intersection between the base portion 41*b* and the wire connecting portion 42*b*.

One end (upper end) of the accommodation recessed portion 421*b* in the Z-axis direction is open, and the lead-out portion 3*b* of the wire 3 can be inserted (or slid) into the accommodation recessed portion 421*b* from the open part. As shown in FIG. 7A, when the lead-out portion 3*a* is accommodated in the accommodation recessed portion 421*a*, the gap G1 is formed between the lead-out bottom portion 3*a*1 of the lead-out portion 3*a* and the accommodation bottom portion 421*a*1 of the accommodation recessed portion 421*a*, but when the lead-out portion 3*b* is accommodated in the accommodation recessed portion 421*b*, such a gap is not formed. Therefore, in a state where the lead-out portion 3*b* is accommodated in the accommodation recessed portion 421*b*, the lead-out bottom portion 3*b*1 of the lead-out portion 3*b* is placed on the upper surface of the base portion 41*b*, and the lead-out bottom portion 3*b*1 and the upper surface of the base portion 41*b* are in contact with each other.

The gap G2 is formed between the end portion of the lead-out portion 3*b* on the side opposite to the lead-out bottom portion 3*b*1 and the top portion of the wire connecting portion 42*b* in the Z-axis direction, similar to the case of the accommodation recessed portion 421*a*.

A depth D3 of the accommodation recessed portion 421*b* in the Z-axis direction may be determined based on the height L9 of the lead-out portion 3*b*, similar to the depth D2 of the accommodation recessed portion 421*a* in the Z-axis direction. In this case, a ratio D3/L9 of the depth D3 to the height L9 is preferably $1<D3/L9\leq 1.5$, and more preferably $1<D3/L9\leq 1.3$. The depth D3 of the accommodation recessed portion 421*b* in the Z-axis direction defined here is a depth of a part of the accommodation recessed portion 421*b* where the lead-out portion 3*b* can be actually disposed, and corresponds to a depth from the top portion of the wire connecting portion 42*b* in the Z-axis direction to the upper surface of the base portion 41*b*. The depth D3 of the accommodation recessed portion 421*b* in the Z-axis direction is substantially equal to the depth D2 of the accommodation recessed portion 421*a* in the Z-axis direction.

The depth D3 of the accommodation recessed portion 421*b* in the Z-axis direction may be determined based on the length L7 of the wire connecting portion 42*b* shown in FIG. 6, and a ratio D3/L7 of the depth D3 to the height L7 is preferably $1/2<D3/L7<1$, and more preferably $5/8<D3/L7\leq 7/8$. By setting the ratio D3/L7 within the above-mentioned range, the lead-out portion 3*b* can be accommodated in the accommodation recessed portion 421*b* such that a part of the lead-out portion 3*b* does not protrude to the outside from the upper end portion of the accommodation recessed portion 421*b*.

The pair of protruding portions 422*b* and 422*b* are formed so that the accommodation recessed portion 421*b* is placed between the protruding portions 422*b* and 422*b*. An extending direction of the protruding portions 422*b* and 422*b* is the same as that of the protruding portions 422*a* and 422*a*, which is the Z-axis direction. A length of each of the protruding portions 422*b* and 422*b* along the Z-axis direction corresponds to the length L7 of the wire connecting portion 42*b* along the Z-axis direction (FIG. 6).

An interval between one protruding portion 422*b* and the other protruding portion 422*b* in the X-axis direction (that is, the width of the accommodation recessed portion 421*b* in the X-axis direction) is larger than a plate thickness of the lead-out portion 3*b* of the wire 3. This is to make an easier insertion of the lead-out portion 3*b* into the accommodation recessed portion 421*b*. The lead-out portion 3*b* is fixed to be sandwiched between the protruding portions 422*b* and 422*b* inside the accommodation recessed portion 421*b*.

As shown in FIG. 7A, the accommodation recessed portion 421*a* and the accommodation recessed portion 421*b* are displaced from each other along the Z-axis direction. In addition, the position of the lead-out portion 3*a* accommodated in the accommodation recessed portion 421*a* in the Z-axis direction and the position of the lead-out portion 3*b* accommodated in the accommodation recessed portion 421*b* in the Z-axis direction are displaced from each other.

In the present embodiment, since the lead-out portion 3*a* and the lead-out portion 3*b* are led out from the coil 2 in a state where the lead-out portion 3*a* and the lead-out portion 3*b* are displaced from each other along the Z-axis direction, the wire connecting portions 42*a* and 42*b* are formed such that the accommodation recessed portion 421*a* and the accommodation recessed portion 421*b* are displaced from each other along the Z-axis direction. A displacement width between the accommodation recessed portion 421*a* and the accommodation recessed portion 421*b* along the Z-axis direction corresponds to a distance between the lead-out position 2*c* (FIG. 5) of the lead-out portion 3*a* and the lead-out position 2*d* (FIG. 5) of the lead-out portion 3*b* along the Z-axis direction. The displacement width between the accommodation recessed portion 421*a* and the accommodation recessed portion 421*b* along the Z-axis direction may correspond to the width of the wire 3 (the lead-out portions 3*a* and 3*b*) along the Z-axis direction.

Further, the displacement width between the accommodation recessed portion 421*a* and the accommodation recessed portion 421*b* along the Z-axis direction may correspond to the distance between the tip end portions of the pair of protruding portions 422*a* and 422*a* and the tip end portions of the pair of protruding portions 422*b* and 422*b*. Moreover, the displacement width between the accommodation recessed portion 421*a* and the accommodation recessed portion 421*b* along the Z-axis direction may correspond to the distance between the accommodation bottom portion 421*a*1 of the accommodation recessed portion 421*a* and the upper surface of the base portion 41*b*. In addition, the displacement width between the accommodation recessed portion 421*a* and the accommodation recessed portion 421*b* along the Z-axis direction may correspond to the length of the flat plate portion 420 of the wire connecting portion 42*a* along the Z-axis direction.

When the wire connecting portions 42*a* and 42*b* are viewed from the front (Y-axis positive direction side), as shown in FIGS. 7A and 8, the accommodation recessed portions 421*a* and 421*b* are disposed on the inner side with respect to a position of an outer periphery of the coil 2 in the X-axis direction. That is, a distance L10 between the accommodation recessed portion 421*a* and the accommodation recessed portion 421*b* is smaller than the outer diameter R2 of the coil 2. In addition, the distance L10 is smaller than a distance between the first lead-out position 2*c* (FIG. 5) of the lead-out portion 3*a* and the second lead-out position 2*d* (FIG. 5) of the lead-out portion 3*b* in the wire 3, and the accommodation recessed portion 421*a* and the accommodation recessed portion 421*b* are disposed between the first lead-out position 2*c* and the second lead-out position 2*d*. Therefore, as shown in FIG. 8, the lead-out portions 3*a* and 3*b* are accommodated in the accommodation recessed portions 421*a* and 421*b* in a state of being led out while being inclined to the inner side by a predetermined angle with respect to the Y-axis direction.

In this case, as shown in FIG. 7A, due to the elastic force of the lead-out portion 3*a*, the lead-out portion 3*a* abuts, of the pair of protruding portions 422*a* and 422*a*, only the protruding portion 422*a* on the outer side in the X-axis direction (the X-axis negative direction side). In addition, due to the elastic force of the lead-out portion 3*b*, the lead-out portion 3*b* abuts, of the pair of protruding portions 422*b* and 422*b*, only the protruding portion 422*b* on the outer side in the X-axis direction (the X-axis positive direction side).

In a state where the lead-out portions 3*a* and 3*b* of the wire 3 are accommodated in the accommodation recessed portions 421*a* and 421*b*, laser irradiation is performed on the wire connecting portions 42*a* and 42*b*, and as shown in FIG. 2, the molten material (joint portion or joint member) 9 made of a welding ball or the like is formed on each of the wire connecting portions 42*a* and 42*b*. As a result, the pair of protruding portions 422*a* and 422*a* shown in FIG. 6 are connected to each other via the molten material 9, and the pair of protruding portions 422*b* and 422*b* are connected to each other via the molten material 9. The laser irradiation on the wire connecting portions 42*a* and 42*b* is performed from a direction inclined by a predetermined angle with respect to the Y-axis direction, and the laser irradiation is performed such that the wide surfaces of the lead-out portions 3*a* and 3*b* are irradiated with laser. The molten material 9 is mainly formed on a surface (laser irradiation surface) of each of the wire connecting portions 42*a* and 42*b* on the Y-axis positive direction side.

As shown in FIG. 6, the connecting portions 43*a* and 43*b* are raised along the Z-axis direction at positions in the base portions 41*a* and 41*b* different from the wire connecting portions 42*a* and 42*b*. The connecting portions 43*a* and 43*b* are raised from the outer edge portions 41*a*3 and 41*b*3 opposite to the inner edge portions 41*a*1 and 41*b*1 of the base portions 41*a* and 41*b* in the X-axis direction, and are formed closer to the wire connecting portions 42*a* and 42*b* than the side edge portions 41*a*2 and 41*b*2 of the base portions 41*a* and 41*b* in the Y-axis direction. The connecting portions 43*a* and 43*b* connect the base portions 41*a* and 41*b* with the mounting portions 44*a* and 44*b*.

The connecting portions 43*a* and 43*b* include mounting auxiliary portions 430*a* and 430*b* and side lead-out portions 431*a* and 431*b*. The side lead-out portions 431*a* and 431*b* are connected to the outer edge portions 41*a*3 and 41*b*3 of the base portions 41*a* and 41*b*. The side lead-out portions 431*a* and 431*b* have surfaces parallel to the XY plane, and extend toward the outer side in the X-axis direction to the positions of the side surfaces of the core 8 in the X-axis direction.

The mounting auxiliary portions 430*a* and 430*b* are connected to the end portions of the side lead-out portions 431*a* and 431*b* in the X-axis direction, and extend upward.

The mounting auxiliary portions 430*a* and 430*b* have surfaces parallel to the YZ plane, and extend to the position of the mounting surface 8*a* of the core 8 along each side surface of the core 8 in the X-axis direction. The side lead-out portions 431*a* and 431*b* are embedded in the core 8, while the mounting auxiliary portions 430*a* and 430*b* are exposed to the outside of the core 8.

The mounting portions 44*a* and 44*b* are connected to end portions of the mounting auxiliary portions 430*a* and 430*b* in the Z-axis direction, and extend to the inner side in the X-axis direction. The mounting portions 44*a* and 44*b* have surfaces parallel to the XY plane, and are formed along the mounting surface 8*a* of the core 8 shown in FIG. 2. The mounting portions 44*a* and 44*b* are exposed to the outside of the core 8 on the mounting surface 8*a*, and constitute a connecting portion with a circuit board or the like (not shown) when mounting the inductor 1.

The mounting portions 44*a* and 44*b* are to be connected to a circuit board or the like via a connection member such as solder or a conductive adhesive. At this time, solder fillets can be formed in the mounting auxiliary portions 430*a* and 430*b*, thereby increasing the mounting strength of the inductor 1 with respect to the circuit board or the like.

Next, a method of manufacturing the inductor 1 will be described with reference to FIGS. 9A to 9E and the like. In the method of the present embodiment, first, a conductive plate such as a metal plate (for example, a Sn-plated metal plate) is punched into a shape as shown in FIG. 9A or 9C. As shown in the same figures, the terminals 4*a* and 4*b* connected to a frame 7 via the connecting portions 43*a* and 43*b* are formed on the conductive plate after punching. In the frame 7, the terminals 4*a* and 4*b* are disposed at a predetermined interval along the X-axis direction, and the interval corresponds to the distance L1 shown in FIG. 8.

Next, as shown in FIG. 9A, the coil 2 is placed on the base portions 41*a* and 41*b* such that the second end portion 2*b* of the coil 2 is in contact with the base portions 41*a* and 41*b*, and the second end portion 2*b* of the coil 2 is disposed to straddle the base portions 41*a* and 41*b* disposed at a predetermined interval along the X-axis direction.

At this time, the lead-out portions 3*a* and 3*b* of the wire 3 are accommodated in the accommodation recessed portions 421*a* and 421*b* of the wire connecting portions 42*a* and 42*b*, and are connected to the terminals 4*a* and 4*b*. The lead-out portions 3*a* and 3*b* can be accommodated by, for example, being inserting (sliding) downward from the upper end portions of the accommodation recessed portions 421*a* and 421*b*. The lead-out portion 3*b* of the wire 3 is placed on the base portion 41*b* such that the lead-out bottom portion 3*b*1 is in contact with the base portion 41*b*. After the lead-out portions 3*a* and 3*b* are accommodated in the accommodation recessed portions 421*a* and 421*b*, the lead-out portions 3*a* and 3*b* may be temporarily fixed to the accommodation recessed portions 421*a* and 421*b* with an adhesive or the like.

Next, as shown in FIG. 9B, the molten material 9 is formed on each of the wire connecting portions 42*a* and 42*b* by irradiating the wire connecting portions 42*a* and 42*b* with a laser beam from a direction inclined by a predetermined angle with respect to the Y-axis direction. Accordingly, the pair of protruding portions 422*a* and 422*a* are connected to each other via the molten material 9, and the pair of protruding portions 422*b* and 422*b* are connected to each other via the molten material 9. The range in which the molten material 9 is formed is not limited to the shown range, and may be appropriately changed within a range in which the lead-out portions 3*a* and 3*b* and the wire connecting portions 42*a* and 42*b* can be satisfactorily connected to each other.

Figure 9D:
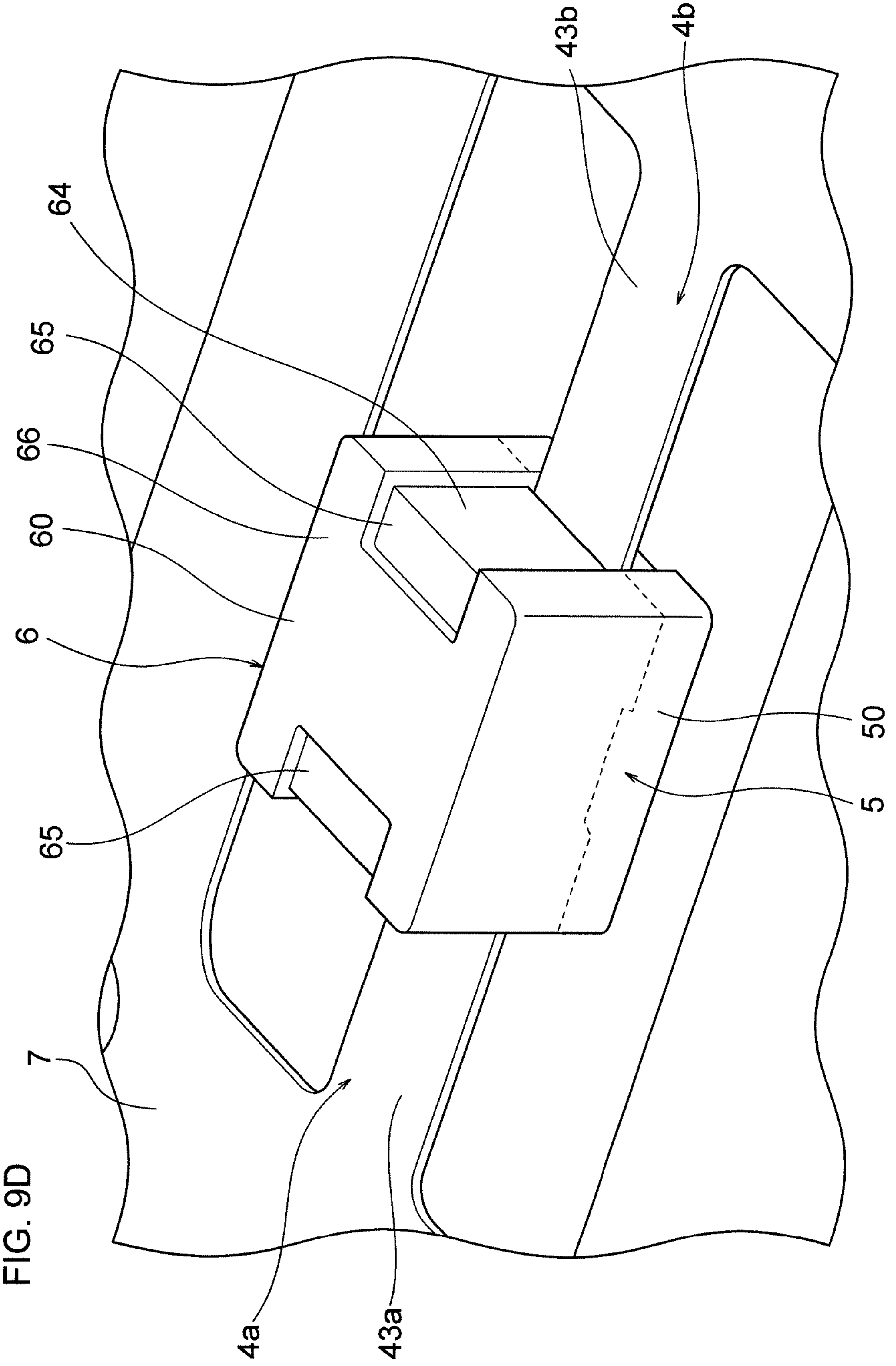
FIG. 9D is a diagram showing a step subsequent to FIG. 9C.

Next, the coil 2 in which the terminals 4*a* and 4*b* are fixed to each end portion is provided inside a mold, and as shown in FIG. 9C, the first core 5 shown in FIG. 3 and the first core 6 shown in FIG. 4 are combined with the coil 2 to form a temporary assembly shown in FIG. 9D. More specifically, the columnar portion 51 (FIG. 3) of the first core 5 is inserted into the inner side of the coil 2, and the coil 2 is placed on the stepped upper portion 501 of the core base portion 50. Meanwhile, the base portions 41*a* and 41*b* of the terminals 4*a* and 4*b* are placed on each stepped portion 500 of the core base portion 50.

The first core 5 and the second core 6 are combined such that the wire connecting portions 42*a* and 42*b* of the terminals 4*a* and 4*b* are accommodated inside the terminal accommodation grooves 62*a* and 62*b*, the lead-out portions 3*a* and 3*b* of the wire 3 are accommodated inside the coupling grooves 63*a* and 63*b*, and the columnar portion 51 of the first core 5 and the coil 2 are accommodated inside the accommodation hole 61 of the second core 6. The connecting portions 43*a* and 43*b* of the terminals 4*a* and 4*b* are exposed from the first core 5 and the second core 6. As the first core 5 and the second core 6, previously molded cores (temporarily molded cores) are used. As a material constituting the first core 5 and the second core 6, a material having fluidity is used, and a composite magnetic material obtained by using a thermoplastic resin or a thermosetting resin as a binder is used.

Figure 9E:
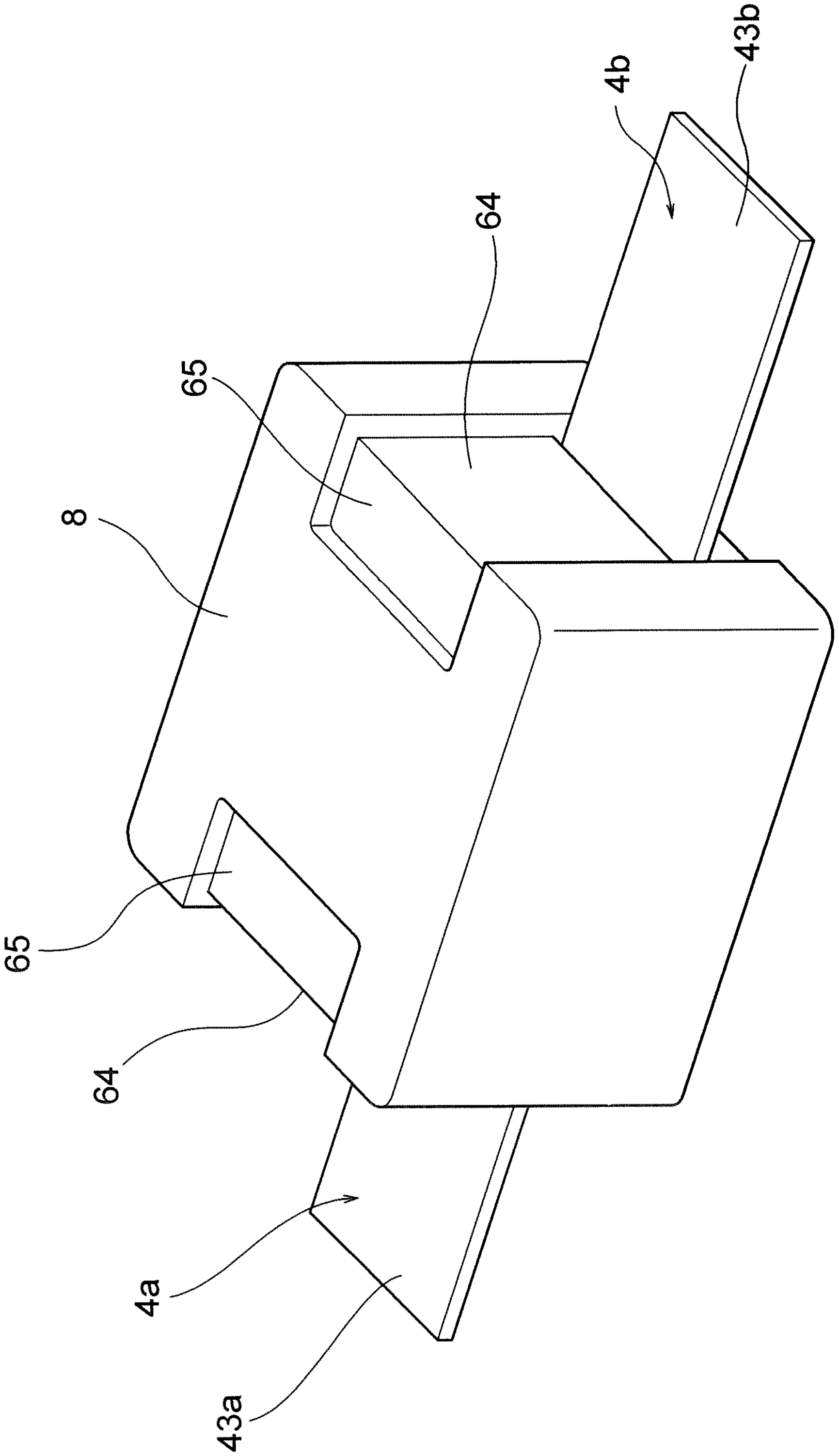
FIG. 9E is a diagram showing a step subsequent to FIG. 9D.

Next, the first core 5 and the second core 6 of the temporary assembly shown in FIG. 9D are compression-molded using a jig (upper and lower punches or the like) of a mold, and the first core 5 and the second core 6 are integrated to form the core 8 (FIG. 9E). At this time, it is possible to easily integrate the first core 5 and the second core 6 by applying heat.

Figure 9F:
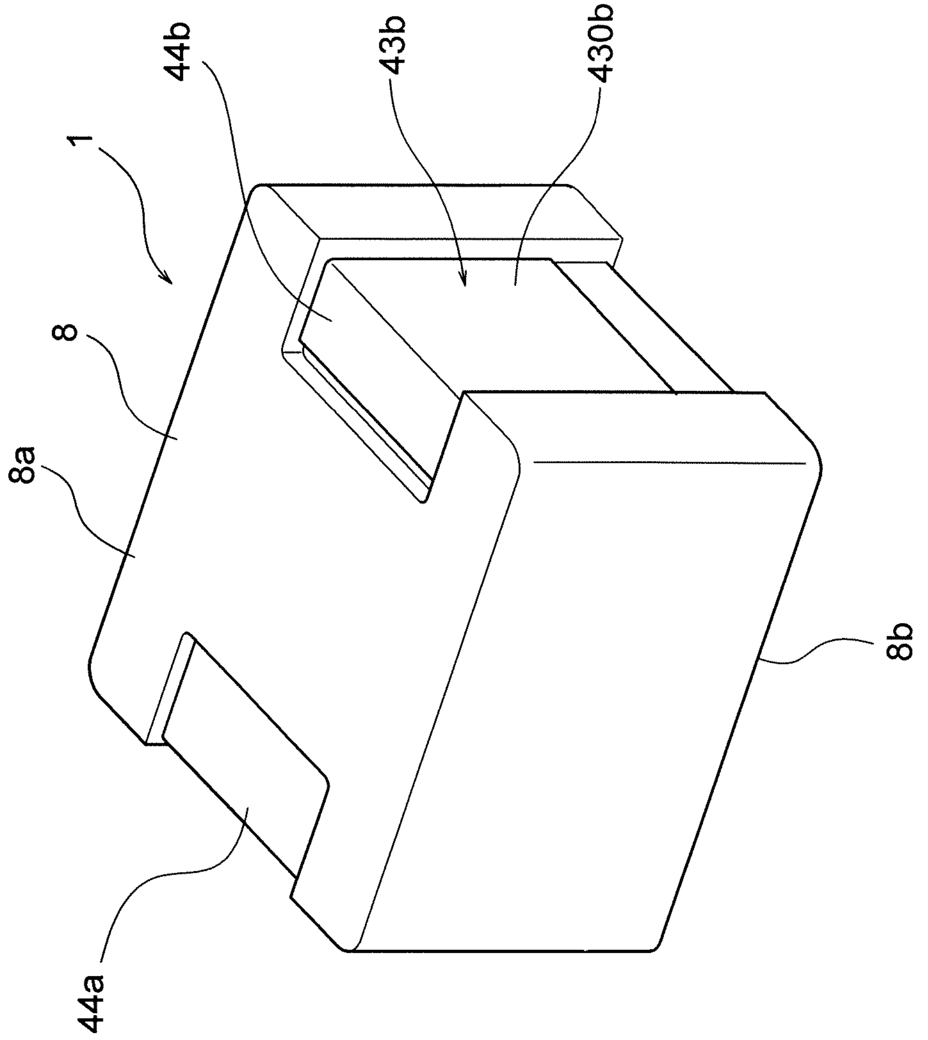
FIG. 9F is a diagram showing a step subsequent to FIG. 9E.

Next, as shown in FIG. 9E, the frame 7 shown in FIG. 9D is cut and removed by a cutting tool such that only the connecting portions 43*a* and 43*b* remain. Then, the connecting portions 43*a* and 43*b* are fixed to the second recessed portions 64 and the third recessed portions 65. More specifically, as shown in FIG. 9F, the connecting portions 43*a* and 43*b* of the terminals 4*a* and 4*b* are bent substantially perpendicularly from the state shown in FIG. 9E, and the connecting portions 43*a* and 43*b* are fixed to the second recessed portions 64. Further, in this state, the tip end portions of the connecting portions 43*a* and 43*b* are bent substantially perpendicularly and fixed to the third recessed portions 65. Accordingly, the mounting auxiliary portions 430*a* and 430*b* of the terminals 4*a* and 4*b* are formed in the second recessed portions 64, and the mounting portions 44*a* and 44*b* of the terminals 4*a* and 4*b* are formed in the third recessed portions 65. As described above, the inductor 1 according to the present embodiment can be obtained.

In the coil device 1 according to the present embodiment, as shown in FIG. 2, the terminals 4*a* and 4*b* include the base portions 41*a* and 41*b* on which the second end portion 2*b* of the coil 2 is provided. Therefore, when manufacturing the coil device 2, it is possible to provide the coil 2 together with the terminals 4*a* and 4*b* inside the mold in a state where the second end portion 2*b* of the coil 2 is placed on the base portions 41*a* and 41*b*. Accordingly, since the second end portion 2*b* of the coil 2 is supported by the base portions 41*a* and 41*b* by placing the second end portion 2*b* of the coil 2 on the base portions 41*a* and 41*b*, even the pressing force acts on the coil 2 during the compression molding of the first core 5 (FIG. 3) and the second core 6 (FIG. 4), the coil 2 is less likely to be displaced in the Z-axis direction, and the position of the second end portion 2*b* of the coil 2 is fixed to the positions of the base portions 41*a* and 41*b*. Therefore, it is possible to determine the position of the coil 2 inside the core 8 at a predetermined position (upper surfaces of the base portions 41*a* and 41*b*), and it is possible to prevent generation of deviations in the inductance characteristics and the like in products due to deviations in the position of the coil 2 and to realize a highly reliable inductor 1.

In the present embodiment, as shown in FIG. 7B, the second end portion 2*b* of the coil 2 and the lead-out bottom portion 3*b*1 of the lead-out portion 3*b* of the wire are placed on the base portion 41*b*. Therefore, since the lead-out bottom portion 3*b*1 is supported by the base portion 41*b*, even the pressing force acts on the lead-out portion 3*b* during the compression molding, the lead-out portion 3*b* is less likely to be displaced in the Z-axis direction. Therefore, it is possible to determine the position of the lead-out portion 3*b* inside the core 8 at a predetermined position (the upper surface of the base portion 41*b*), and it is possible to effectively prevent generation of deviations in the inductance characteristics and the like in products due to deviations in the position of the lead-out portion 3*b*.

In the present embodiment, as shown in FIG. 2, since the shape of the base portions 41*a* and 41*b* is a flat plate shape, it is possible to place the second end portion 2*b* of the coil 2 on the base portions 41*a* and 41*b* in a stable state without tilting the second end portion 2*b* of the coil 2. Moreover, since the wire connecting portions 42*a* and 42*b* are raised from the base portions 41*a* and 41*b* along the Z-axis direction, it is possible to dispose the wire connecting portions 42*a* and 42*b* near the lead-out positions 2*c* and 2*d* (FIG. 5) of the lead-out portions 3*a* and 3*b* placed on the base portions 41*a* and 41*b*, and the lead-out portions 3*a* and 3*b* can be easily connected to the wire connecting portions 42*a* and 42*b*. In addition, height positions of the lead-out portions 3*a* and 3*b* and height positions of the wire connecting portions 42*a* and 42*b* are easily aligned with each other, and in this respect, the lead-out portions 3*a* and 3*b* can also be easily connected to the wire connecting portions 42*a* and 42*b*.

In the present embodiment, since the mounting auxiliary portions 430*a* and 430*b* extending to be exposed to the outside along the side surfaces of the core 8 are formed in the base portions 41*a* and 41*b*, it is possible to form solder fillets in the mounting auxiliary portions 430*a* and 430*b* when mounting the inductor 1, and it is possible to increase the mounting strength of the inductor 1.

In the present embodiment, as shown in FIG. 6, the connecting portions 43*a* and 43*b* include the side lead-out portions 431*a* and 431*b* connected to the base portions 41*a* and 41*b* and extending toward the side surfaces of the core 8, and the mounting auxiliary portions 430*a* and 430*b* connected to the side lead-out portions 431*a* and 431*b* and extending along the side surfaces of the core 8, and the mounting portions 44*a* and 44*b* formed on the mounting surface 8*a* of the core 8 and extending toward the center of the core 8 are connected to the mounting auxiliary portions 430*a* and 430*b*. By leading out the connecting portions 43*a* and 43*b* to the side surfaces of the core 8 via the side lead-out portions 431*a* and 431*b* and further bending the connecting portions 43*a* and 43*b* a plurality of times to form the mounting auxiliary portions 430*a* and 430*b* and the mounting portions 44*a* and 44*b*, it is possible to sufficiently ensure lengths of the mounting auxiliary portions 430*a* and 430*b* and the mounting portions 44*a* and 44*b*, and it is possible to increase the mounting strength of the inductor 1.

As shown in FIG. 8, in the present embodiment, the second end portion 2*b* of the coil 2 is provided on the base portions 41*a* and 41*b* such that the inner edge portions 41*a*1 and 41*b*1 of the base portions are located between the outer peripheral surface and the inner peripheral surface of the coil. Therefore, it is possible to dispose the second end portion 2*b* of the coil 2 on the base portions 41*a* and 41*b* in a stable state. In addition, since the inner edge portions 41*a*1 and 41*b*1 of the base portions 41*a* and 41*b* are not disposed in a passage of the magnetic flux passing through the inner peripheral side of the coil 2, it is possible to favorably ensure the passage of the magnetic flux to realize the inductor 1 having the favorable inductance characteristics.

In the present embodiment, when viewed from the Z-axis direction, the center of the coil 2 is displaced with respect to the center of the core 8 in the Y-axis negative direction side. Therefore, it is possible to ensure a space having an area corresponding to the displacement width of the center of the coil 2 on the Y-axis positive direction side of the coil 2, and to dispose a part of the terminals 4*a* and 4*b* (the end portions of the wire connecting portions 42*a* and 42*b* and the end portions of the base portions 41*a* and 41*b* on the Y-axis positive direction side) in this space. Therefore, it is not necessary to expand the side portion of the core 8 on the Y-axis positive direction side to the outer side in order to ensure a space for disposing a part of the terminals 4*a* and 4*b*, and it is possible to reduce the size of the inductor 1.

Moreover, the present invention is not limited to the above-mentioned embodiments, and various modifications can be made within the scope of the present invention.

In the above-mentioned embodiment, an example of application to the inductor of the present invention has been shown, but the present invention may be applied to a coil device other than the inductor.

In the above-mentioned embodiment, the wire 3 is formed of a flat wire, but may be constituted of a wire other than a flat wire, such as a round wire or a rectangular wire.

In the above-mentioned embodiment, the winding shape of the wire 3 is a circular spiral shape, but may be an elliptical spiral shape, a square spiral shape, or the like.

In the above-mentioned embodiment, the core 8 is constituted by two cores, which are the first core 5 and the second core 6, but the core 8 of the inductor 1 may be constituted by only one core. In this case, the core 8 may be formed inside the mold by compression molding, injection molding, or the like.

REFERENCE SIGNS LIST

1 inductor (coil device)
2 coil
2*a* first end portion
2*b* second end portion
2*c* first lead-out position
2*d* second lead-out position
3 wire
3*a*, 3*b* lead-out portion
3*a*1, 3*b*1 lead-out bottom portion
4*a*, 4*b* terminal
41*a*, 41*b* base portion
41*a*1, 41*b*1 inner edge portion
41*a*2, 41*b*2 side edge portion
41*a*3, 41*b*3 outer edge portion
42*a*, 42*b* wire connecting portion
420 flat plate portion

421*a*, 421*b* accommodation recessed portion
421*a*1 accommodation bottom portion
422*a*, 422*b* protruding portion
43*a*, 43*b* connecting portion
430*a*, 430*b* mounting auxiliary portion
431*a*, 431*b* side lead-out portion
44*a*, 44*b* mounting portion
5 first core
50 core base portion
500 stepped portion
501 stepped upper portion
51 columnar portion
52 first recessed portion
6 second core
60 main body portion
61 accommodation hole
62*a*, 62*b* terminal accommodation groove
63*a*, 63*b* coupling groove
64 second recessed portion
65 third recessed portion
66 bottom portion
7 frame
8 core
8*a* mounting surface
8*b* opposite mounting surface
80 side recessed portion
9 molten material

What is claimed is:

1. A coil device, comprising:
an element body;
a coil embedded in the element body; and
a terminal including a wire connecting portion disposed inside the element body, wherein
the terminal includes a base portion disposed inside the element body,
the coil has a wound portion spirally wound and a lead-out portion lead out from the wound portion and connected to the wire connecting portion,
an end portion of the wound portion in the winding axis direction is placed on the base portion without being adhered or fixed to the base portion by an adhesive or a fixing member such that the end portion directly contacts to the base portion, and
the entire lead-out portion is placed on the base portion without being adhered or fixed to the base portion by an adhesive or a fixing member such that the entire lead-out portion directly contacts to the base portion.

2. The coil device according to claim 1, wherein
the base portion has a flat plate shape extending in a direction substantially orthogonal to the winding axis direction, and
the wire connecting portion is raised from the base portion along the winding axis direction.

3. The coil device according to claim 2, wherein
the end portion of the wound portion in the winding axis direction is placed on the base portion such that a part of an inner edge portion of the base portion is located between an outer peripheral surface and an inner peripheral surface of the coil wound portion.

4. The coil device according to claim 1, wherein
the base portion has a flat plate shape extending in a direction substantially orthogonal to the winding axis direction, and
the wire connecting portion is raised from the base portion along the winding axis direction.

5. The coil device according to claim 1, wherein
the base portion has a flat plate shape extending in a direction substantially orthogonal to the winding axis direction, and
the base portion is formed with a connecting portion raised along the winding axis direction at a position different from that of the wire connecting portion and the connecting portion extends to be exposed to an outside along a side surface of the element body.

6. The coil device according to claim 5, wherein
the connecting portion includes a side lead-out portion connected to the base portion and extending toward the side surface of the element body, and a mounting auxiliary portion connected to the side lead-out portion and extending along the side surface of the element body, and
a mounting portion formed on a mounting surface of the element body to extend toward a center of the element body is connected to the mounting auxiliary portion.

7. The coil device according to claim 1, wherein
the end portion of the wound portion in the winding axis direction is placed on the base portion such that a part of an inner edge portion of the base portion is located between an outer peripheral surface and an inner peripheral surface of the wound portion.

8. The coil device according to claim 1, wherein
the end portion of the wound portion in the winding axis direction is placed on the base portion such that a part of an inner edge portion of the base portion is located between an outer peripheral surface and an inner peripheral surface of the wound portion.

9. The coil device according to claim 1, wherein
a center of the wound portion is displaced with respect to a center of the element body.

10. The coil device according to claim 9, wherein
the terminal comprises a pair of terminals including a first terminal and a second terminal, and
the wound portion is placed on the base portion such that an outer peripheral surface of the wound portion does not exceed a virtual line defined to connect a first wire connecting portion of the first terminal and a second wire connecting portion of the second terminal.

11. The coil device according to claim 1, wherein
the terminal comprises a pair of terminals including a first terminal and a second terminal, and
the wound portion is placed on the base portion such that an outer peripheral surface of the wound portion does not exceed a virtual line defined to connect a first wire connecting portion of the first terminal and a second wire connecting portion of the second terminal.

* * * * *